(12) United States Patent
Gutman et al.

(10) Patent No.: US 12,541,005 B2
(45) Date of Patent: Feb. 3, 2026

(54) DISTORTION REMOVAL FROM A SENSING SIGNAL

(71) Applicant: QUALCOMM Incorporated, San Diego, CA (US)

(72) Inventors: Igor Gutman, Hod HaSharon (IL); Tao Luo, San Diego, CA (US); Evgeny Levitan, Haifa (IL); Ariel Yaakov Sagi, Haifa (IL); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/470,112

(22) Filed: Sep. 19, 2023

(65) Prior Publication Data

US 2025/0093464 A1    Mar. 20, 2025

(51) Int. Cl.
*G01S 7/40* (2006.01)
*G01S 7/00* (2006.01)
*G01S 7/03* (2006.01)

(52) U.S. Cl.
CPC ............... *G01S 7/40* (2013.01); *G01S 7/006* (2013.01); *G01S 7/038* (2013.01)

(58) Field of Classification Search
CPC . G01S 7/40; G01S 7/006; G01S 7/038; H04B 1/525; H04B 1/0475; H04B 1/1027; H04B 1/10; H04B 1/1081; H04B 1/7107; H04B 15/00; H04B 17/0085
See application file for complete search history.

(56) References Cited

U.S. PATENT DOCUMENTS

| | | | |
|---|---|---|---|
| 12,283,982 B2 * | 4/2025 | Anis | H04L 5/1461 |
| 2019/0207738 A1 | 7/2019 | Son et al. | |
| 2019/0327070 A1 | 10/2019 | Jung et al. | |
| 2022/0350010 A1 | 11/2022 | Sagi et al. | |
| 2023/0119415 A1 | 4/2023 | Barbu et al. | |
| 2023/0179241 A1 | 6/2023 | Luo | |
| 2024/0410973 A1 * | 12/2024 | Pandharipande | H04L 25/0204 |

OTHER PUBLICATIONS

International Search Report and Written Opinion—PCT/US2024/043202—ISA/EPO—Dec. 10, 2024.

* cited by examiner

*Primary Examiner* — Lester G Kincaid
(74) *Attorney, Agent, or Firm* — Kevin M. Donnelly; Harrity & Harrity, LLP

(57) ABSTRACT

Various aspects of the present disclosure generally relate to wireless communication. In some aspects, a wireless communication device (WCD) may use training data associated with distortion of sensing signals. Some aspects more specifically relate to correcting distortion from a sensing signal in association with the training data. In some examples, the training data may include distortion measured in an environment without a sensing target. In some examples, the training data may include distortion measured via a dedicated hardware path within the WCD. The WCD may use the training data to identify whether an object is present or may use the training data to remove distortion from a sensing signal.

30 Claims, 11 Drawing Sheets

DISTORTION REMOVAL FROM A SENSING SIGNAL

FIELD OF THE DISCLOSURE

Aspects of the present disclosure generally relate to wireless communication and specifically relate to techniques, apparatuses, and methods for distortion removal from a sensing signal.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (V2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

Sensing signals may be used to obtain positioning information to map an environment of a wireless communication device (WCD) or to track an object within the environment, among other examples. In some examples, a sensing signal may be used to track movements in a sport training scenario, detect gestures and associated inputs, detect dangerous movements in the environment, detect medical abnormalities, or find a hidden object, among other examples. To obtain the positioning information, the WCD may transmit a sensing signal via a transmission front end component and may receive the sensing signal via a reception front end component after interacting with an object. In addition to receiving the sensing signal after interacting with the object, the WCD may also receive self-interference from the signal without interacting with the object. In some examples, the WCD may receive the self-interference with a higher signal strength than the sensing signal after interacting with the object, which may limit an effective range of the WCD for sensing.

SUMMARY

Some aspects described herein relate to a method of wireless communication performed by a wireless communication device (WCD). The method may include transmitting a training sensing signal. The method may include receiving, via one or more reception components, the training sensing signal having first distortion associated with one or more non-linear characteristics of one or more transmission components or reception components. The method may include transmitting a sensing signal. The method may include receiving the sensing signal, reception of the sensing signal comprising one or more of removal or cancellation of second distortion from the sensing signal in accordance with the first distortion.

Some aspects described herein relate to a WCD for wireless communication. The wireless communication device may include one or more memories storing processor readable code and one or more processors coupled with the one or more memories. The one or more processors may be individually or collectively operable to cause the wireless communication device to transmit a training sensing signal. The one or more processors may be individually or collectively operable to cause the wireless communication device to receive the training sensing signal having first distortion associated with one or more non-linear characteristics of one or more transmission components or reception components. The one or more processors may be individually or collectively operable to cause the wireless communication device to transmit a sensing signal. The one or more processors may be individually or collectively operable to cause the wireless communication device to receive the sensing signal, reception of the sensing signal comprising one or more of removal or cancellation of second distortion from the sensing signal in accordance with the first distortion.

Some aspects described herein relate to a non-transitory computer-readable medium that stores a set of instructions for wireless communication by a WCD. The set of instructions, when executed by one or more processors of the WCD, may cause the WCD to transmit a training sensing signal. The set of instructions, when executed by one or more processors of the WCD, may cause the WCD to receive the training sensing signal having first distortion associated with one or more non-linear characteristics of one or more transmission components or reception components. The set of instructions, when executed by one or more processors of the WCD, may cause the WCD to transmit a sensing signal. The set of instructions, when executed by one or more processors of the WCD, may cause the WCD to receive the sensing signal, reception of the sensing signal comprising one or more of removal or cancellation of second distortion from the sensing signal in accordance with the first distortion.

Some aspects described herein relate to an apparatus for wireless communication. The apparatus may include means for transmitting a training sensing signal. The apparatus may include means for receiving, via one or more reception components, the training sensing signal having first distortion associated with one or more non-linear characteristics of one or more transmission components or reception components. The apparatus may include means for transmitting a sensing signal. The apparatus may include means for receiving the sensing signal, reception of the sensing signal comprising one or more of removal or cancellation of second distortion from the sensing signal in accordance with the first distortion.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
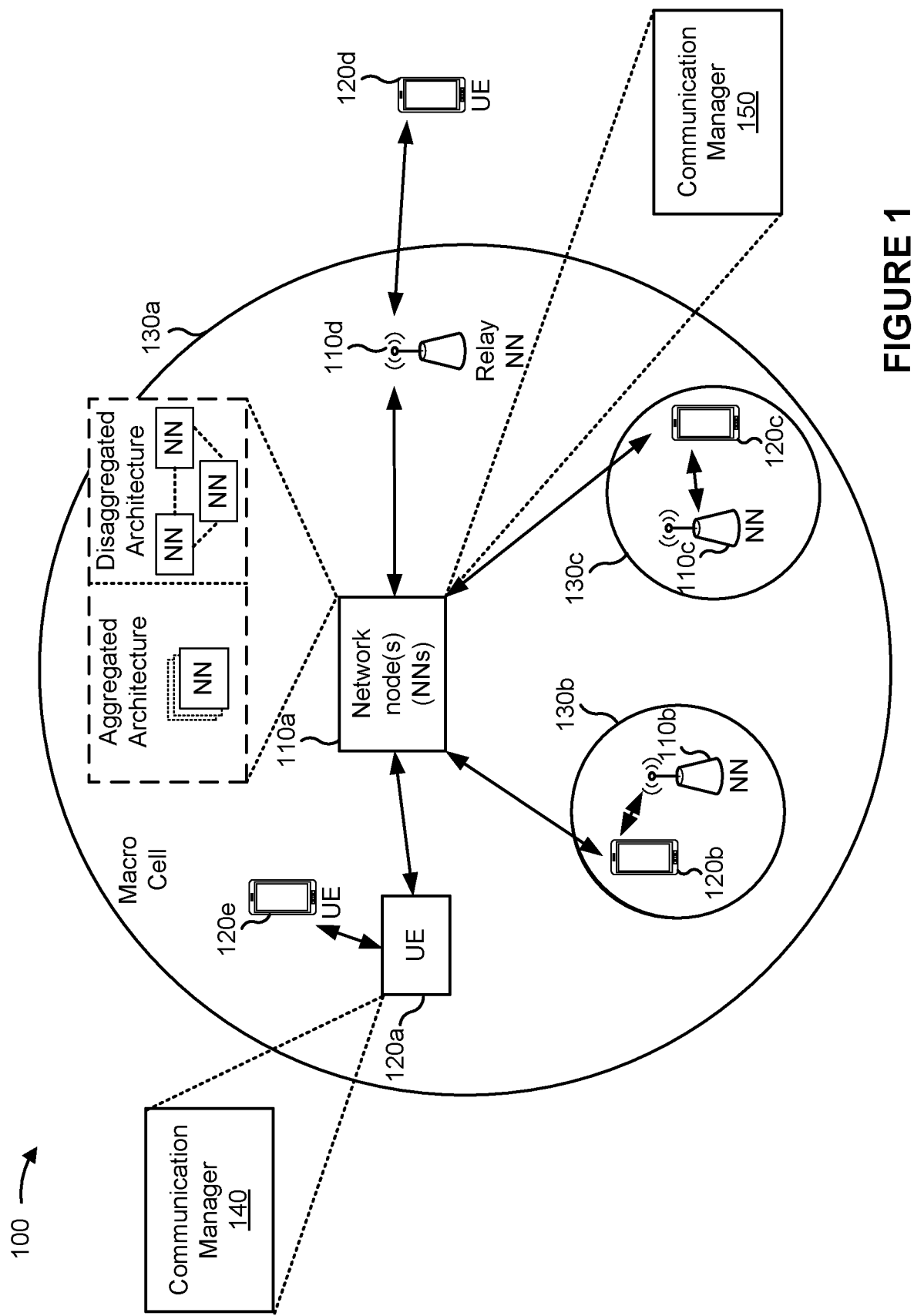
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a wireless communication device (WCD) using training data associated with distortion of sensing signals. Some aspects more specifically relate to correcting (for example, removing) distortion from a sensing signal in association with the training data. In some examples, the training data may include distortion measured in an environment such as a field of view without a sensing target (for example, in a factory setting configured for calibration, in an open space with the WCD oriented to transmit sensing signals in a direction without a sensing target, among other examples). In some examples, the training data may include distortion measured via a dedicated hardware path within the WCD. The WCD may use the training data to identify whether an object is present or may use the training data to remove distortion from a sensing signal (for example, a combination of a reflected signal after interaction with the object and a self-interference of the sensing signal that the WCD receives without first interacting with the object).

Particular aspects of the subject matter described in this disclosure can be implemented to realize one or more of the following potential advantages. In some aspects, the training data may include information for correcting distortion that includes non-linearity (NL) distortion. For example, the training data may account for NL distortion caused by one or more transmission elements, such as a power amplifier, or NL distortion cause by one or more reception elements, such as a low-noise amplifier, thermal distortion, or an analog-to-digital converter (ADC), among other examples. In this way, the WCD may improve self-interference (SI) correction within a sensing signal in association with correcting linear and NL distortion. By improving SI correction within the sensing signal, a sensing range may be improved in association with reducing the SI to a power (for example, reference signal received power (RSRP)) that is sufficiently low to detect a reflection of the sensing signal after interaction with a sensing target with increased distance from the WCD (for example, in comparison to a distance at which the WCD can detect the sensing target without using the training data to remove the NL distortion).

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing ("sensing"), and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d. The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHz through 24.25 GHZ), FR4a or FR4-1 (52.6 GHz through 71 GHZ), FR4 (52.6 GHz through 114.25 GHZ), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components or systems that enable communication between a UE 120 and one or more devices, components or systems of the wireless communication network 100. A network node 110 may be, may include, or may also be referred to as, an NR network node, a 5G network node, a 6G network node, a Node B, an eNB, a gNB, an access point (AP), a transmission reception point (TRP), a mobility element, a core, a network entity, a network element, a network equipment, and/or another type of device, component or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node, meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (Dus), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more Cus, one or more Dus, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As indicated above, a BWP may be configured as a subset or a part of a total or full component carrier bandwidth and generally forms or encompasses a set of contiguous common resource blocks (CRBs) within the full component carrier bandwidth. In other words, within the carrier bandwidth, a BWP starts at a CRB and may span a set of consecutive CRBs. Each BWP may be associated with its own numerology (indicating a sub-carrier spacing (SCS) and cyclic prefix (CP)). A UE 120 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 120 within the operating bandwidth of the serving cell while all other BWPs with which the UE 120 is configured are deactivated. On deactivated BWPs, the UE 120 does not transmit or receive any communications.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein.

Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 or the network node 110 may include or may be included in a housing that houses components associated with the UE 120 or the network node 110 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an unmanned aerial vehicle or drone, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e. This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some examples, a UE 120 may implement power saving features, such as for UEs 120 in an RRC connected mode, an RRC idle mode, or an RRC inactive mode. Power saving features may include, for example, relaxed radio resource monitoring (such as for devices operating in low mobility or in good radio conditions), discontinuous reception (DRX), reduced PDCCH monitoring during active times, and/or power-efficient paging reception. In some examples, a UE 120 may operate in association with a DRX configuration (for example, indicated to the UE 120 by a network node 110). DRX operation may enable the UE 120 to enter a sleep mode at various times while in the coverage area of a network node 110 to reduce power consumption for conserving battery resources, among other examples. The DRX configuration generally configures the UE 120 to operate in association with a DRX cycle. The UE 120 may repeat DRX cycles with a configured periodicity according to the DRX configuration. A DRX cycle May include a DRX on duration during which the UE 120 is in an awake mode or in an active state, and one or more durations during which the UE 120 may operate in an inactive state, which may be opportunities for the UE 120 to enter a DRX sleep mode in which the UE 120 may refrain from monitoring for communications from a network node 110. Additionally or alternatively, the UE 120 may deactivate one or more antennas, RF chains, and/or other hardware components or devices while operating in the DRX sleep mode.

The time during which the UE 120 is configured to be in an active state during a DRX on duration may be referred to as an active time, and the time during which the UE 120 is configured to be in an inactive state, such as during a DRX sleep duration, may be referred to as an inactive time. During a DRX on duration, the UE 120 may monitor for downlink communications from one or more network nodes 110. If the UE 120 does not detect and/or does not successfully decode any downlink communications during the DRX on duration, the UE 120 may enter a DRX sleep mode for the inactive time duration at the end of the DRX on duration. Conversely, if the UE 120 detects and/or successfully decodes a downlink communication during the DRX on duration, the UE 120 may remain in the active state for the duration of a DRX inactivity timer (which may extend the active time). The UE 120 may start the DRX inactivity timer at a time at which the downlink communication is received. The UE 120 may remain in the active state until the DRX inactivity timer expires, at which time the UE 120 may transition to the sleep mode for an inactive time duration. Additionally or alternatively, the UE 120 may use a DRX cycle referred to as an extended DRX (eDRX) cycle, such as for use cases that are tolerant to latency. An eDRX cycle may include a relatively longer inactive time relative to a baseline DRX cycle (for example, an eDRX cycle may have a lower ratio of active time to inactive time).

In some aspects, a WCD may include the UE 120 or the network node 110. The WCD may include a communication manager 140 or 150. As described in more detail elsewhere herein, the communication manager 140 or 150 may transmit a training sensing signal; receive the training sensing signal having first distortion associated with one or more non-linear characteristics of one or more transmission components or reception components; transmit a sensing signal; and receive the sensing signal, reception of the sensing signal comprising one or more of removal or cancellation of second distortion from the sensing signal in accordance with the first distortion. Additionally or alternatively, the communication manager 140 or 150 may perform one or more other operations described herein.

Figure 2:
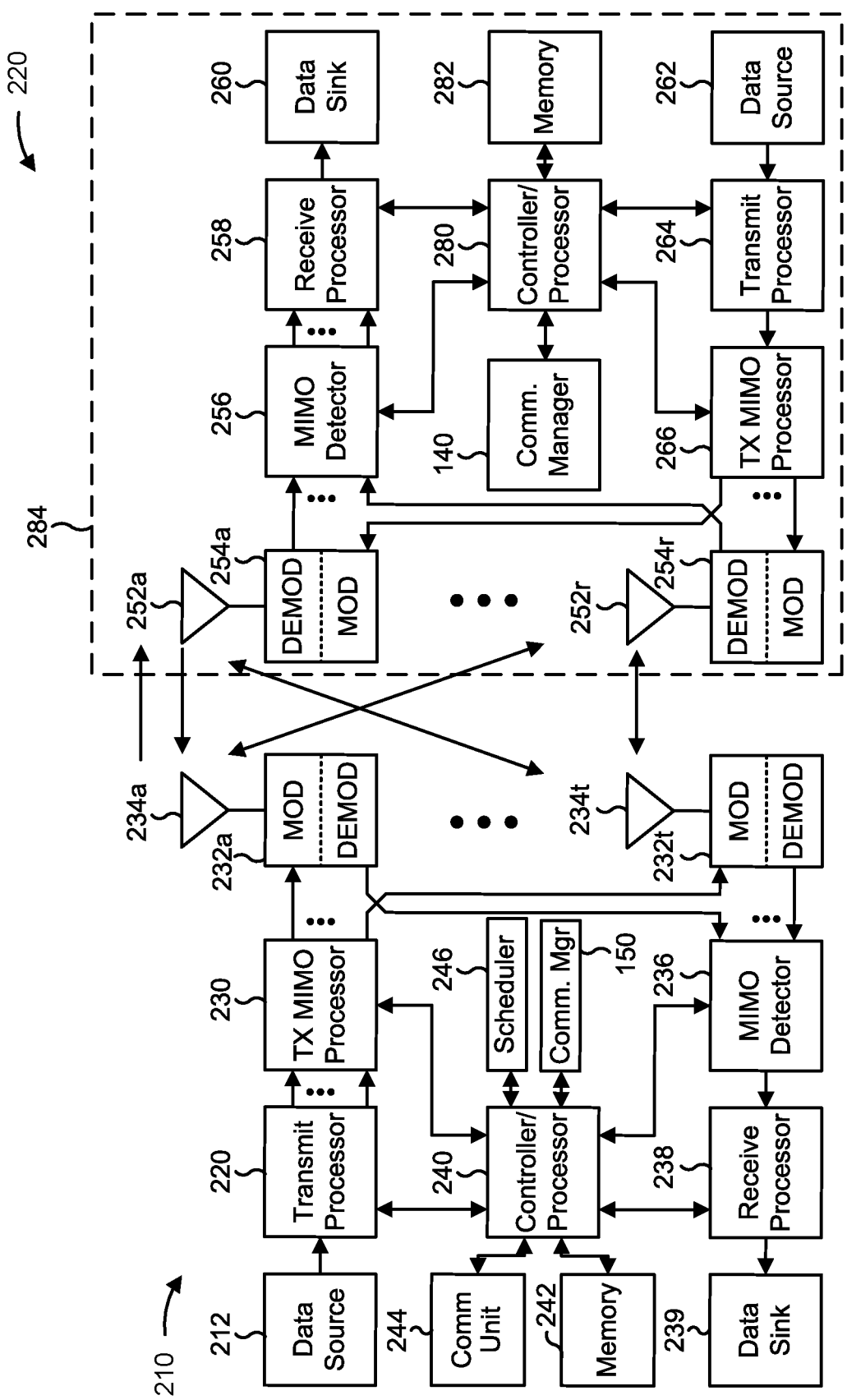
FIG. 2 is a diagram illustrating an example network node in communication with an example UE in a wireless network in accordance with the present disclosure.

FIG. 2 is a diagram illustrating an example network node 210 in communication with an example UE 220 in a wireless network in accordance with the present disclosure. The network node 210 of FIG. 2 may be an example of the network node 110 described with reference to FIG. 1. Similarly, the UE 220 may be an example of the UE 120 described with reference to FIG. 1.

As shown in FIG. 2, the network node 210 may include a data source 212, a transmit processor 214, a transmit (TX) multiple-input multiple-output (MIMO) processor 216, a set of modems 232 (shown as 232a through 232t, where t≥1), a set of antennas 234 (shown as 234a through 234v, where v≥1), a MIMO detector 236, a receive processor 238, a data sink 239, a controller/processor 240, a memory 242, a communication unit 244, a scheduler 246, and/or a communication manager 150 among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 210. The transceiver may be under control of and used by a processor, such as the controller/processor 240, and in some aspects in conjunction with processor-readable code stored in the memory 242, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 210 may include transmit processor 214, TX MIMO processor 216, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

For downlink communication from the network node 210 to the UE 220, the transmit processor 214 may receive data ("downlink data") intended for the UE 220 (or a set of UEs that includes the UE 220) from the data source 212 (such as a data pipeline or a data queue). In some examples, the transmit processor 214 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 210 may use the scheduler 246 to schedule one or more UEs 220 for downlink or uplink communications. In some aspects, the scheduler 246 may use DCI to dynamically schedule DL transmissions to the UE 220 and/or UL transmissions from the UE 220. In some examples, the scheduler 246 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 214, the TX MIMO processor 216, the modem 232, the antenna 234, the MIMO detector 236, the receive processor 238, and/or the controller/processor 240 may be included in an RF chain of the network node 210. An RF chain may include filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 210 may use the communication unit 244 to transmit and/or receive data associated with the UE 220 or to perform network control signaling, among other examples. The communication unit 244 may include a transceiver and/or an interface, such as a network interface.

The UE 220 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 220 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 220. The transceiver may be under control of and used by a processor, such as the controller/processor 280, and in some aspects in conjunction with processor-readable code stored in the memory 282, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 252 may receive the downlink communications or signals from the network node 210 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 220 to the data sink 260 (such as a data pipeline, a data queue, and/or an application executed on the UE 220), and may provide decoded control information and system information to the controller/processor 280.

For uplink communication from the UE 220 to the network node 210, the transmit processor 264 may receive and process data ("uplink data") from a data source 262 (such as a data pipeline, a data queue, and/or an application executed on the UE 220) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 210 or another UE), one or more parameters relating to transmission of the uplink communication. The one or more parameters may include an RSRP parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254r may transmit a set of uplink signals (for example, R uplink signals) via the corresponding set of antennas 252. An uplink signal may include an uplink control information (UCI) communication, a MAC CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an) can be dynamically controlled by modifying the phase shifts, phase offsets, and/or amplitudes of the multiple signals relative to each other.

Different UEs 220 or network nodes 110 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or a SRS set ID, among other examples. A TCI state information element (sometimes referred to as a TCI state herein) may indicate particular information associated with a beam. For example, the TCI state information element may indicate a TCI state identification (for example, a tci-StateID), a quasi-co-location (QCL) type (for example, a qcl-Type1, qcl-Type2, qcl-TypeA, qcl-TypeB, qcl-TypeC, or a qcl-TypeD, among other examples), a cell identification (for example, a Serv-CellIndex), a bandwidth part identification (bwp-Id), or a reference signal identification, such as a CSI-RS identification (for example, an NZP-CSI-RS-ResourceId or an SSB-Index, among other examples). Spatial relation information may similarly indicate information associated with an uplink beam. The beam indication may be a joint or separate DL/UL beam indication in a unified TCI framework. In a unified TCI framework, the network may support common TCI state ID update and activation, which may provide common QCL and/or common UL transmission spatial filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

In some examples, the network may support a layer 1 (L1)-based beam indication using at least UE-specific (unicast) DCI to indicate joint or separate DL/UL beam indications that may be selected from active TCI states. In some examples, DCI formats 1_1 and/or 1_2 may be used for beam indication. The network node 210 may include a support mechanism for the UE 220 to acknowledge successful decoding of a beam indication. For example, the acknowledgment/negative acknowledgment of the PDSCH scheduled by the DCI carrying the beam indication may also be used as an acknowledgement for the DCI.

Further efficiencies in throughput, signal strength, and/or other signal properties may be achieved through beam refinement. For example, the network node 210 may be capable of communicating with the UE 220 using beams of various beam widths. For example, the network node 210 may be configured to utilize a wider beam to communicate with the UE 220 when the UE 220 is in motion because wider coverage may increase the likelihood that the UE 220 remains in coverage of the network node 210 while moving. Conversely, the network node 210 may use a narrower beam to communicate with the UE 220 when the UE 220 is stationary because the network node 210 can reliably focus coverage on the UE 220 with low or minimal likelihood of the UE 220 moving out of the coverage area of the network node 210. In some examples, to select a particular beam for communication with a UE 220, the network node 210 may transmit a reference signal, such as a synchronization signal block (SSB) or a CSI-RS, on each of a plurality of beams in a beam-sweeping manner. In some examples, SSBs may be transmitted on wider beams, whereas CSI-RSs may be transmitted on narrower beams. The UE 220 may measure the RSRP or the signal-to-interference-plus-noise ratio (SINR) on each of the beams and transmit a beam measurement report (for example, an L1 measurement report) to the network node 210 indicating the RSRP or SINR associated with each of one or more of the measured beams. The network node 210 may then select the particular beam for communication with the UE 220 based on the L1 measurement report. In some other examples, when there is channel reciprocity between the uplink and the downlink, the network node 210 may derive the particular beam to communicate with the UE 220 (for example, on both the uplink and downlink) based on uplink measurements of one or more uplink reference signals, such as an SRS, transmitted by the UE 220.

One enhancement for multi-beam operation at higher carrier frequencies is facilitation of efficient (for example, low latency and low overhead) downlink and/or uplink beam management operations to support higher Layer 1 and/or Layer 2 (L1/L2)-centric inter-cell mobility. L1 and/or L2 signaling may be referred to as "lower layer" signaling and may be used to activate and/or deactivate candidate cells in a set of cells configured for L1/L2 mobility and/or to provide reference signals for measurement by the UE 220, by which the UE 220 may select a candidate beam as a target beam for a lower layer handover operation. Accordingly, one goal for L1/L2-centric inter-cell mobility is to enable a UE to perform a cell switch via dynamic control signaling at lower layers (for example, DCI for L1 signaling or a medium access control (MAC) control element (MAC CE) for L2 signaling), rather than semi-static Layer 3 (L3) RRC signaling, in order to reduce latency, reduce overhead, and/or otherwise increase efficiency of the cell switch.

In some examples, for a UE 220, UL transmission may be performed using one antenna panel, and DL reception may be performed using another antenna panel. In some examples, full-duplex communication may be conditional on a beam separation of the UL beam and DL beam at respective antenna panels. Utilizing full-duplex communication may provide a reduction in latency, such that it may be possible to receive a DL signal in UL-only slots, which may enable latency savings. In addition, full-duplex communication may enhance spectrum efficiency per cell or per UE 220, and may enable more efficient utilization of resources. Beam separation of the UL and DL beams assists in limiting or reducing self-interference that may occur during full duplex communication. UL and DL beams that are separated on their respective antenna panels may provide reliable full duplex communication by minimizing or reducing self-interference.

A full-duplex UE 220 may perform a self-interference measurement (SIM) procedure to identify self-interference from transmissions of the full-duplex UE 220. A full-duplex network node 210 also may perform a SIM procedure to identify self-interference from transmissions of the full-duplex network node 210. The UE 220 may provide a measurement report to the network node 210 to indicate results of the UE SIM. The network node 210 may select pairs of beams (referred to herein as "beam pairs") for the UE 220 ("UE beam pairs") and the network node 210 ("network node beam pairs") to use during full-duplex communications. A beam pair generally includes a receive (Rx) beam and a transmit (Tx) beam, such as a DL beam and an UL beam, respectively, for the UE 220, and similarly, an UL beam and a DL beam, respectively, for the network node 210.

Figure 3:
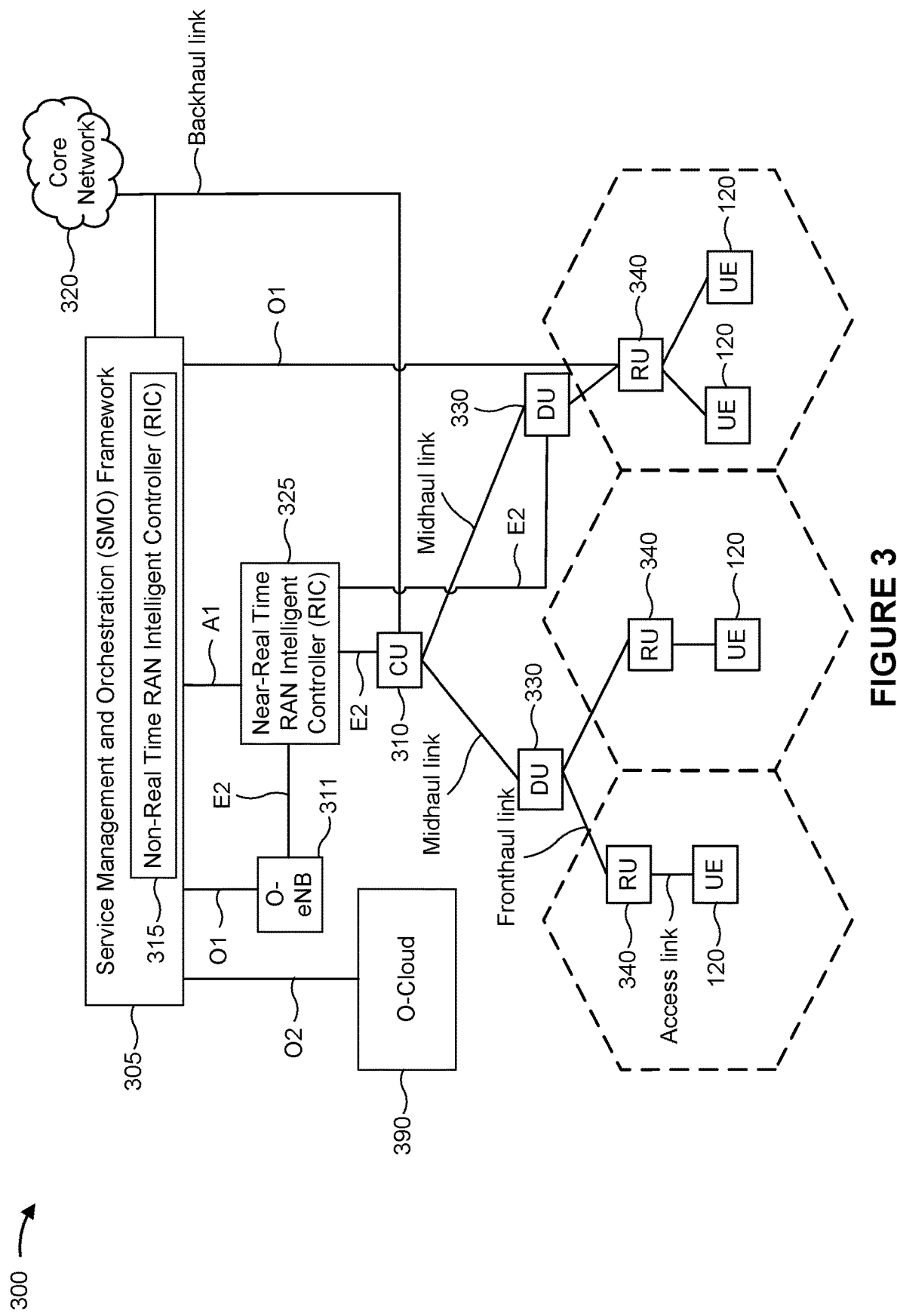
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110 or one or more network nodes 210). The disaggregated base station architecture 300 may include a CU 310 that can communicate directly with a core network 320 via a backhaul link, or that can communicate indirectly with the core network 320 via one or more disaggregated control units, such as a Near-RT RIC 325 (for example, via an E2 link) and/or a Non-RT RIC 315 associated with a Service Management and Orchestration (SMO) Framework 305. The CU 310 may communicate with one or more Dus 330 via respective midhaul links, such as via F1 interfaces. Each of the Dus 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the Cus 310, the Dus 330, the RUs 340, the Near-RT RICs 325, the Non-RT RICs 315, and the SMO Framework 305, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more Dus 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 305 may support RAN deployment and provisioning of non-virtualized and virtualized network elements. For non-virtualized network elements, the SMO Framework 305 may support the deployment of dedicated physical resources for RAN coverage requirements, which may be managed via an operations and maintenance interface, such as an O1 interface. For virtualized network elements, the SMO Framework 305 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 315, and/or a Near-RT RIC 325. In some aspects, the SMO Framework 305 may communicate with a hardware aspect of a 4G RAN, a 5G NR RAN, and/or a 6G RAN, such as an open eNB (O-eNB) 311, via an O1 interface. Additionally or alternatively, the SMO Framework 305 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 315 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 325. The Non-RT RIC 315 may be coupled to or may communicate with (such as via an A1 interface) the Near-RT RIC 325. The Near-RT RIC 325 may include or may implement a logical function that enables near-real-time control and optimization of RAN elements and resources via data collection and actions via an interface (such as via an E2 interface) connecting one or more cUs 310, one or more dUs 330, and/or an O-eNB with the Near-RT RIC 325.

In some aspects, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may tune RAN behavior or performance. For example, the Non-RT RIC 315 may monitor long-term trends and patterns for performance and may employ AI/ML models to perform corrective actions via the SMO Framework 305 (such as reconfiguration via an O1 interface) or via creation of RAN management policies (such as A1 interface policies).

The network node 110, the controller/processor 240 of the network node 210, the UE 120, the controller/processor 280 of the UE 220, the CU 310, the DU 330, the RU 340, or any other component(s) of FIG. 1, 2, or 3 may implement one or more techniques or perform one or more operations associated with distortion removal from a sensing signal, as described in more detail elsewhere herein. For example, the controller/processor 240 of the network node 210, the controller/processor 280 of the UE 220, any other component(s) of FIG. 2, the CU 310, the DU 330, or the RU 340 may perform or direct operations of, for example, process 1000 of FIG. 10 or other processes as described herein (alone or in conjunction with one or more other processors). The memory 242 may store data and program codes for the network node 110, the network node 210, the CU 310, the DU 330, or the RU 340. The memory 282 may store data and program codes for the UE 120 or the UE 220. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 310, the DU 330, or the RU 340, may cause the one or more processors to perform process 1000 of FIG. 10, or other processes as described herein. In some examples, executing instructions may include running the instructions, converting the instructions, compiling the instructions, and/or interpreting the instructions, among other examples.

In some aspects, the WCD 405 includes means for transmitting a training sensing signal; means for receiving, via one or more reception components, the training sensing signal having first distortion associated with one or more non-linear characteristics of one or more transmission components or reception components; means for transmitting a sensing signal; and/or means for receiving the sensing signal, reception of the sensing signal comprising one or more of removal or cancellation of second distortion from the sensing signal in accordance with the first distortion. In some aspects, the means for the WCD 405 to perform operations described herein may include, for example, one or more of communication manager 150, transmit processor 240, TX MIMO processor 230, modem 232, antenna 234, MIMO detector 236, receive processor 238, controller/processor 240, memory 242, or scheduler 246. In some aspects, the means for the WCD 405 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 4:
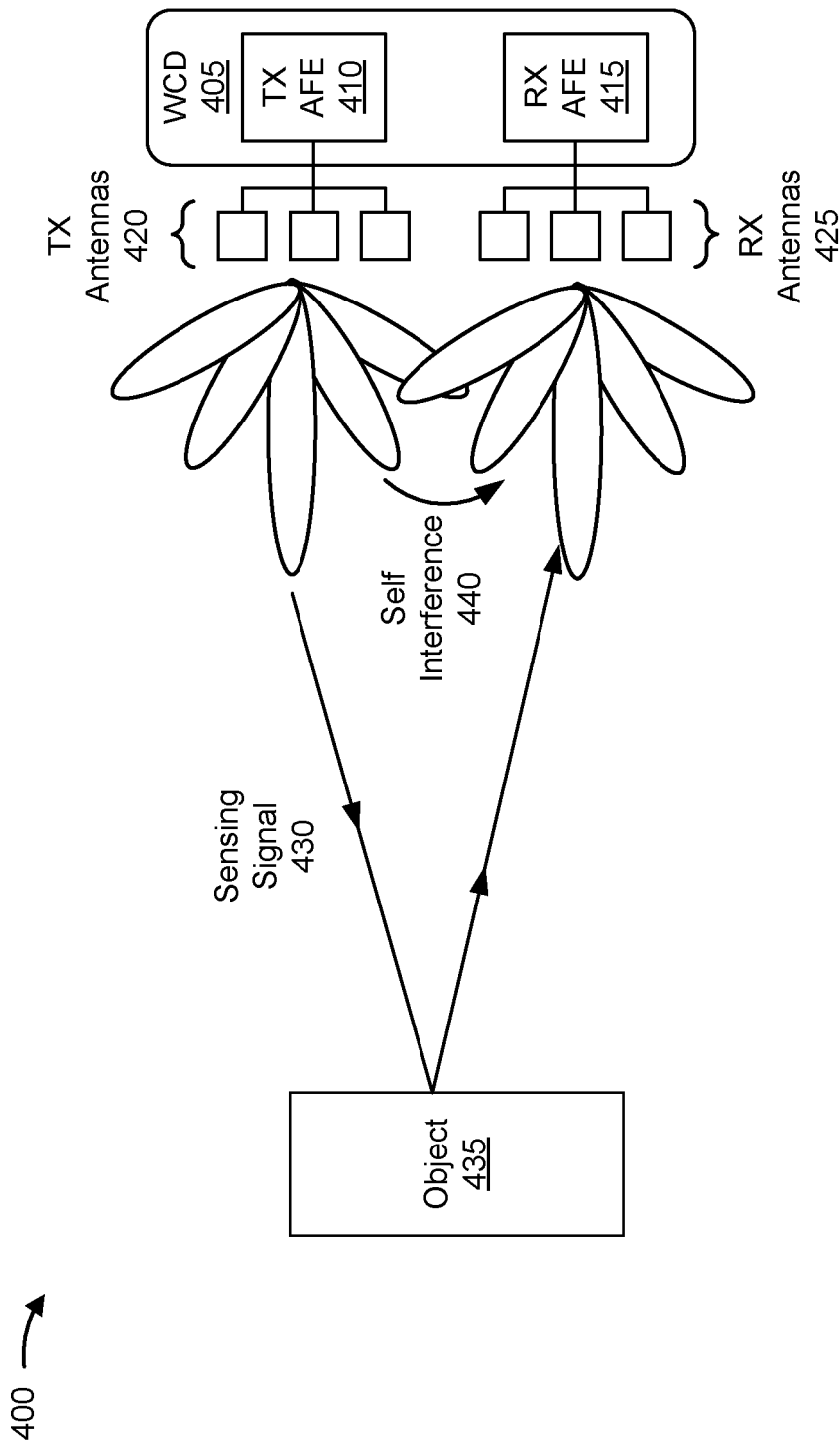
FIG. 4 illustrates an example of self-interference (SI) of a sensing signal in accordance with the present disclosure.

FIG. 4 illustrates an example 400 of SI of a sensing signal in accordance with the present disclosure. As shown in FIG. 4, a WCD 405, such as a UE 120 or 220 or a network node 110 or 210, may be configured to transmit a sensing signal to detect objects (such as sensing targets) within an environment such as a field of view. The WCD 405 may include a transmission analog front end (AFE) 410 and a reception AFE 415. The transmission AFE 410 may be coupled to transmission antennas 420 and the reception AFE 415 may be coupled to reception antennas 425. Although shown as different antennas, the transmission antennas 420 and the reception antennas 425 may include one or more antennas in both sets of the transmission antennas 420 and the reception antennas 425.

The transmission AFE 410 may transmit, via the transmission antennas 420, a sensing signal 430 toward an object 435. The sensing signal 430 may interact with (for example, reflect or scatter from) the object back toward the WCD 405 for reception via the reception antennas 425. In addition to the sensing signal 430 after interacting with the object, the reception antennas 425 may receive the sensing signal 430 as SI 440 (for example, the sensing signal received without interacting with the object 435).

Because isolation between a transmitted signal and a received signal in the WCD 405 may be less than 30 dB and common phase error (CPE) may be less than 70 dB, a significant portion of the transmitted signal may "leak" to a main received signal.

For example, even for CPE, an RSSI of the SI may be larger by 30-40 dB than an RSSI of the sensing signal 430 after interaction with the object 435 at reasonable distances for sensing, which may cause the SI to dominate the sensing signal 430. This may further cause a nonlinear effect of the transmission AFE 410 and the reception AFE 415 to dominate performance of the main received signal (the sensing signal 430 after interaction with the object 435), and limit a range of a sensing function of the WCD 405.

In some networks, in association with the RSSI of the SI 440 being significantly larger than the RSSI of the sensing signal 430, and because a dynamic range of the reception and the transmission components of the WCD 405 is limited, nonlinear impairments of the transmission AFE 410 and the reception AFE 415 that are dominated by the SI, a performance of a sensing operation of the WCD 405 may be limited.

An signal-to-noise ratio (SNR) of the sensing signal 430 may be limited in association with noise that is associated with distortion of the sensing signal 430. For example, noise may include noise from the reception AFE 415, such as thermal noise (for example, a post noise figure), NL noise associated with the AFE (for example, associated with a low noise amplifier (LNA) or a variable gain amplifier (VGA), among other examples), or NL noise associated with an analog-to-digital converter (ADC), among other examples. In some examples, the noise may include noise from the transmission AFE 410, such as NL noise associated with a PA, which may have higher received power than, or may be approximately equal to, a received power of the sensing signal 430.

Some WCDs may attempt to correct some of the noise associated with the sensing signal 430. For example, the WCD 405 may attempt to reduce an impact of NL of the reception AFE 415. For example, in association with the RSSI of the SI 440 being larger than the RSSI of the sensing signal 430, an optimal automatic gain control (AGC) strategy may be used to focus a gain state (GS) of the reception AFE 415 on the RSSI of the SI (for example, assuming that the RSSI of the sensing signal 430 may be neglected). This technique may cause an increased noise figure (NF), while optimizing a total SNR. However, even though the total SNR may be optimized, an impact of a $3^{rd}$ order NL intermodulation (IM3) of the reception AFE 415 on the portion of the sensing signal 430 may be significant and may limit performance of the sensing operation.

The WCD 405 may attempt to reduce an impact of NL of the transmission AFE 410. For some WCDs, handling an NL floor of the transmission AFE 410 may be subject to a selected baseband algorithm. An error vector magnitude (EVM) of the transmission AFE 410 may have a minor impact when SI/EVM<<Thermal⇒SI/EVM<Thermal/10⇒NL floor OverThermal<−10 dB. However, NL of the transmission AFE 410 may impact performance for signals in which SI isolation is not large, which may be common for a UE or customer premises equipment (CPE).

A total signal-to-quantization-noise ratio (SQNR) with the SI may be identified as $$SQNR = DR + 10 \cdot \log_{10}\left(\frac{F_s}{BW}\right) - dB\, Fs - 10 \cdot \log_{10}\left(\frac{SI + mainRx}{mainRx}\right),$$

where a dynamic range of the ADC (Denali) may be ~54 dB, and $$\frac{F_s}{BW} \sim 20 \cong 13\, dB.$$

This analysis doesn't include the "clipping" (relevant for low dBFs) as well as other NL effects of the ADC such as differential NL (DNL) or integral NL (INL), among other examples, even though clipping is not expected to introduce noticeable effect for Decibel relative to full scale (dBFs)>10 dB. Additional processing gain of the symbol combining may not be used in this identification.

In some examples, having more than a single symbol, processing gain may be used to mitigate an impact of NL caused by the ADC. In this way, because the SNR operation point in sensing is small, a total impact of ADC may be small, even for small isolation.

Some WCDs may use analog interference cancelation (AIC) to improve SI effects. For example, AIC may include sampling (for example, by a coupler) a portion of an RF signal (for example, the sensing signal 430), normalizing the RF signal (for example, in phase and amplitude) by a tunable attenuator (for example, using a dedicated low speed digital to analog converter (DAC) and least mean squares (LMS) approach). The WCD 405 may then subtract the interference in the reception RF domain at an LNA input. However, AIC may produce a relatively large noise figure (NF) or an unstable group delay, which may lead to a "notch" in the frequency domain that may reduce a cancelation efficiency. Additionally or alternatively, the AIC may have a significant hardware cost (for example, in FR2 or higher frequency ranges).

Digital interference cancelation (DIC) may be used to improve SI effects. For example, DIC may include synthesizing the SI in a digital domain using knowledge of the WCD 405 of a transmission signal (for example, the sensing signal 430), and the signal after the NL model (for example, a combination of a transmission NL, a reception NL, and of a linear over-the-air channel) may be measured and recorded. Some WCDs may use a single tap minimum mean square error (MMSE) equalizer, in which a cross-correlation is estimated, and used to fine-tune a phase or amplitude of the measured (for example, recorded) reference signal before being subtracted from a measurement of a sensing signal, as received. In some aspects, to reduce a thermal noise enhancement for measuring, several repetitions and averaging may be performed.

In some aspects, instead of measuring and recording a reference, the WCD may estimate a full NL channel (for example, instead of using a simple single tap) and may use this estimate of the NL channel to model the SI (for example, using the known transmission signal or the reference) and to subtract the model of the SI from the measurement of the sensing signal, as received.

This procedure is also called NL interference cancelation (NLIC). However, estimating precise NL models under various NL conditions that involve a concatenation of few linear/NL models, may be challenging, and performance may be limited.

An example of the "single tap MMSE" implementation may include canceling a linear portion of the SI in digital reception components. A "single tap" MMSE coefficient may be estimated to align a phase/gain mismatch, which equalization may be applied prior to cancelation. This approach is sensitive to an RX/TX NL impact and all processing is done in mission mode (for example, at a time of attempting a sensing operation).

Both of AIC or and DIC are unable to efficiently handle the NL impact of the AFEs when there is a dominant SI (for example, in a sensing scenario).

In some aspects described herein, a WCD may use training data associated with distortion of sensing signals to correct (for example, remove) distortion from a sensing signal in association with the training data. In some examples, the training data may include distortion measured in an environment such as a field of view without a sensing target (for example, in a factory setting configured for calibration or in an open space with the WCD oriented to transmit sensing signals in a direction without a sensing target, among other examples). In some examples, the training data may include distortion measured via a dedicated hardware path within the WCD. The WCD may use the training data to identify whether an object is present or may use the training data to remove distortion from a sensing signal (for example, a combination of a reflected signal after interaction with the object and a self-interference of the sensing signal that the WCD receives without first interacting with the object).

In some acts, the WCD may use knowledge of the sensing signal, with a known group delay, and known impairments (for example, transmission and reception nonlinearities or a channel, among other examples) to identify and correct the SI of the sensing signal. For example, the WCD may use a "single tap" type of algorithm or may identify and record the SI, as measured in a testing environment, for use in the reception AFE 415. The identified SI may include linear and nonlinear impairments, which the WCD may use it for cancelation in mission mode.

In mission mode, some variation of phase or amplitude distortion or shift may occur (for example, in association with aging or temperature variation) a "single tap" digital equalization may be applied prior to cancelation. This technique may be less-sensitive to the RX and TX NL impact. However, this may add approximately 3 dB of thermal noise to an estimator, mitigation of which may be performed to further improve performance. For example, the WCD may mitigate the noise (thermal noise) by averaging multiple recordings (for example, saved measurements) of the SI.

In some aspects, the WCD may obtain the SI measurement (for example, test information associated with SI in a training operation) to identify RF impairments without having an undesired target (for example, with a "0" returning wave). The SI measurement in the training operation may identify a first distortion as a reference distortion associated with no returning wave from interaction with an object. For example, the WCD may use a dedicated factory training operation with no sensing target. This may be used to obtain a reference distortion using a clean environment for calibration. In another example, the WCD may use user assistance, by requesting a user to orient the WCD towards an open space (for example, the sky or any other direction in which there is no target) and then initiate a measurement for reference acquisition. In some aspects, the WCD may request input from the use to indicate that the WCD is oriented in a direction that is suitable for reference acquisition (for example, acquisition of distortion measurement without a sensing target). In some aspects, the WCD may initiate an update procedure in association with a change of temperature or aging of the WCD.

In another example, the WCD 405 may use a dedicated hardware path, from the transmission antennas to an LNA input of the reception AFE (for example, similar as for AIC) to measure or record the reference signal. In some aspects, the WCD may align feedback arriving from the dedicated hardware path and the SI in amplitude and phase (for example, using the LMS approach associated with AIC). The WCD may also turn off the reception antennas 425 and record the SI from the feedback path. In some aspects, the WCD may measure the SI from the feedback path repeatedly to mitigate thermal noise. The WCD may then digitally align group delay of the recording to match a group delay of the SI.

When attempting to perform a sensing procedure using the reference distortion, the WCD may transmit multiple symbols of the sensing signal with different scrambling on each symbol. The WCD may estimate a correlation with the reference distortion on each of the symbols and average a correlation result. If the average correlation result converges to an ideal reference correlation (for example, a correlation result associated with measurement in an ideal condition, during a sterile factory training, or using the hardware-assisted solution), then there is no sensing target in the recording. If there is no sensing target in the recording, the recorded reference (per each scrambling sequence index) can be used for a subsequent sensing procedure (for example mission mode).

If a target is identified, the WCD may use a previously known reference distortion, or back off to a linear single tap approach.

In association with the training data accounting for NL distortion caused by one or more transmission elements, the WCD may improve SI correction within a sensing signal in association with correcting linear and NL distortion. By improving SI correction within the sensing signal, a sensing range may be improved in association with reducing the SI to a power (for example, RSRP) that is sufficiently low to detect a reflection of the sensing signal after interaction with a sensing target with increased distance from the WCD (for example, in comparison to a distance at which the WCD can detect the sensing target without using the training data to remove the NL distortion).

Figure 5:
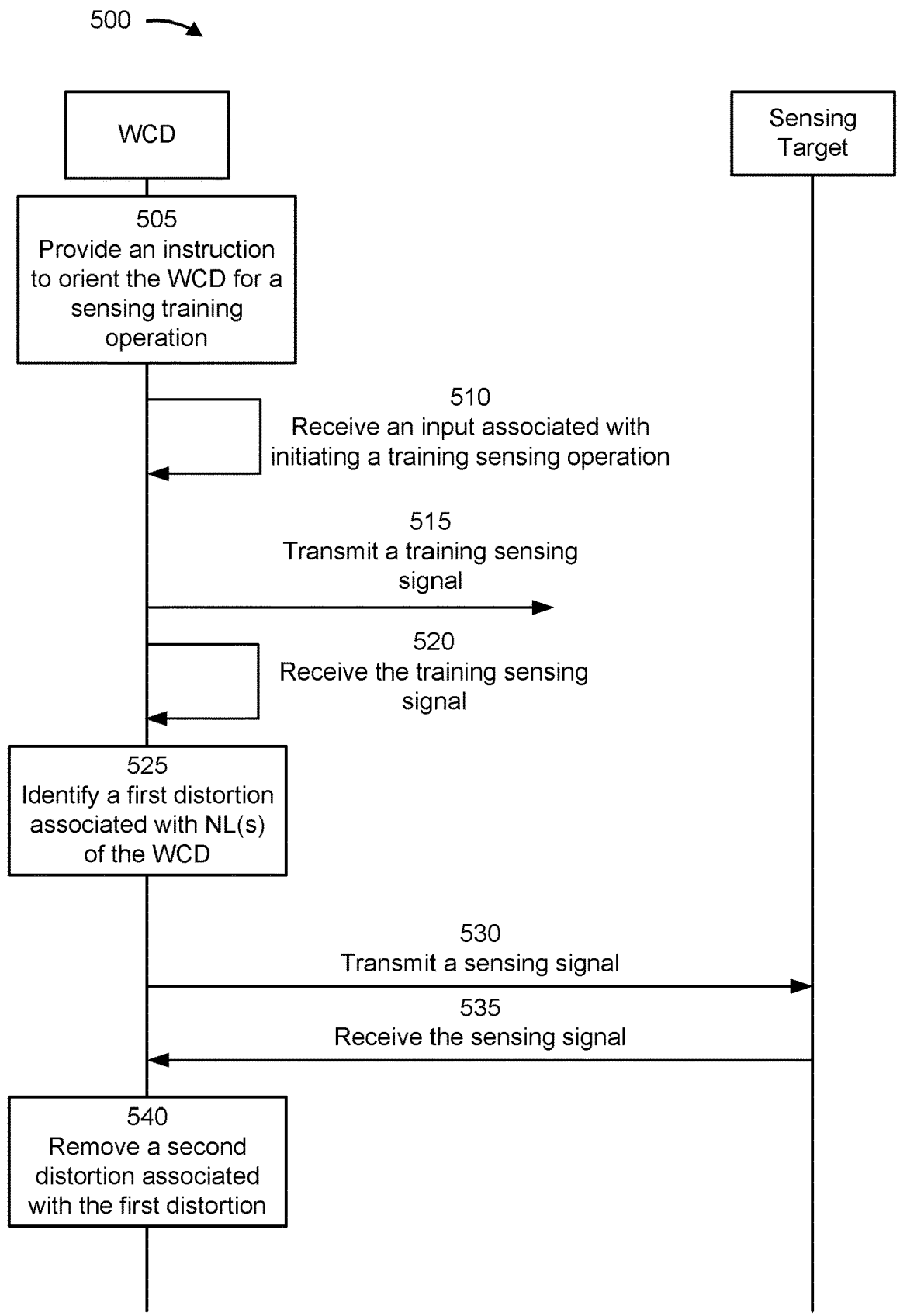
FIG. 5 is a diagram of an example associated with distortion removal from a sensing signal, in accordance with the present disclosure.

FIG. 5 is a diagram of an example 500 associated with distortion removal from a sensing signal, in accordance with the present disclosure. As shown in FIG. 5, a WCD (for example, a UE 120 or 220 or a network node 110 or 210) may perform a sensing training operation and a sensing operation. In aspects described herein, removing distortion may include canceling the distortion. In aspects described herein, canceling distortion maywireless communication deviceclude removing the distortion.

As shown in a first operation 505, the WCD may provide an instruction to orient the WCD for a sensing training operation. For example, the instruction may indicate that a user is to direct (for example, that a user is to direct) a transmitting or receiving antenna to an environment such as a field of view that is void of an object that can be sensed. In some aspects, the WCD may provide the instruction in association with detection of a change in one or more parameters at the WCD. For example, the WCD may detect a change in temperature of the environment, a temperature of the WCD, or satisfaction of an age threshold for an age of the WCD, among other examples.

As shown in a second operation 510, the WCD may receive an input associated with initiating a sensing training operation. For example, the input may indicate that a sensing beam is directed to an environment such as a field of view that is void of an object that can be sensed.

In some aspects, the WCD may receive the input associated with initiating the sensing training operation in association with providing the instruction to orient the WCD for the sensing training operation. For example, the instruction may indicate to direct the UE to the environment that is void of the object that can be sensed, and the input may indicate that the user has complied with the instruction or that the WCD is ready to perform the sensing training operation.

Alternatively, the WCD may receive the input associated with initiating the sensing training operation independently from (for example, in the absence of) providing the instruction described in connection with the first operation 505. For example, the WCD may receive the input from a computing device, a calibration device (for example, in a factory or clean room environment), or from a network node, among other examples.

As shown in a third operation 515, the WCD may transmit a training signal. For example, the WCD may transmit the training signal in association with receiving the input described in connection with the second operation 510. Alternatively, the WCD may transmit the training signal independently from (for example, in the absence of) the input described in connection with the second operation 510.

As shown in a fourth operation 520, the WCD may receive the training signal. For example, the WCD may receive the training signal as an SI signal without first interacting with a sensing target or other object.

In some aspects, the WCD may transmit the training sensing signal and receive the training sensing signal in a test environment. For example, the WCD may transmit and receive the sensing signal in a factory environment or in a clean room environment that is void of objects for sensing. In some aspects, the test environment may be void of objects that are expected to reflect or scatter the training sensing signal back to the WCD.

In some aspects, the WCD may transmit the training sensing signal over the air (for example, via a transmission antenna) and may receive the training sensing signal via a bus that couples a first AFE of the transmission antenna to a second AFE of a reception antenna. In some aspects, the WCD may transmit the training sensing signal over the air and may receive the training sensing signal over the air.

As shown in a fifth operation 525, the WCD may identify a first distortion associated with one or more NLs of the WCD. In some aspects, the training sensing signal, as received by the WCD, may include linear distortion and NL distortion. For example, the training sensing signal may have first distortion associated with one or more NLs of one or more transmission components of the WCD or reception components of the WCD. In some aspects, the first distortion may be associated with a set of temperatures or a set of transmission powers. For example, the first distortion may be associated with a reference temperature, set of temperatures, or temperature range (such as in a table that maps distortions to temperatures). As another example, the first distortion may be associated with a reference transmission power, set of transmission powers, or transmission power range (such as in a table that maps first distortions to transmission powers). The first distortion may be a reference distortion for use in subsequent sensing operations.

As shown in a sixth operation 530, the WCD may transmit a sensing signal. In some aspects, the WCD may transmit the sensing signal using a set of symbols with different scrambling applied on respective symbols of the set of symbols.

As shown in a seventh operation 535, the WCD may receive the sensing signal. For example, the received sensing signal may include a first portion that is SI and a second portion that interacts with the sensing target (for example, after reflection or scattering). In some aspects, in association with receiving the sensing signal, the WCD may estimate correlations for the respective symbols, combine the correlations, and identifying whether a sensing target is present in a sensing beam in association with the combined correlations. For example, the WCD may compare the combined correlations to determine whether a current environment has a same distortion as the test environment associated with the training sensing signal. In some aspects, the WCD may identify an absence of the sensing target within the sensing beam in association with combined correlations for the set of symbols having a similarity, that satisfies a threshold, with combined correlations of the training sensing signal. In some aspects, in association with failing to detect that the sensing target is present the WCD may use a measurement of the received sensing signal to update the first distortion (for example, using the sensing signal as a training sensing signal).

In some aspects, in association with detecting that the sensing target is present, the WCD may perform an eighth operation 540 to remove a second distortion associated with the first distortion. In some aspects, the WCD may identify a presence of the sensing target within the sensing beam in association with combined correlations for the set of symbols having a similarity, that fails to satisfy the threshold, with the combined correlations of the training sensing signal.

As shown in an eighth operation 540, the WCD may remove a second distortion from the sensing signal, with the distortion associated with the first distortion. In some aspects, removing the second distortion may include removing the second distortion in association with a distortion of the set of first distortions. For example, the WCD may identify a correlation value associated with the sensing signal as transmitted and the sensing signal as received and identify the second distortion as a combination of the first distortion and the correlation value.

By removing the second distortion, the WCD may have improved isolation of a portion of the sensing signal after interaction with the sensing target, with less distortion caused by NL of components of the WCD in an SI portion of the sensing signal. In this way, a sensing range may be improved in association with reducing the SI to a power (for example, RSRP) that is sufficiently low to detect a reflection of the sensing signal after interaction with a sensing target with increased distance from the WCD (for example, in comparison to a distance at which the WCD can detect the sensing target without using the training data to remove the NL distortion).

Figure 6:
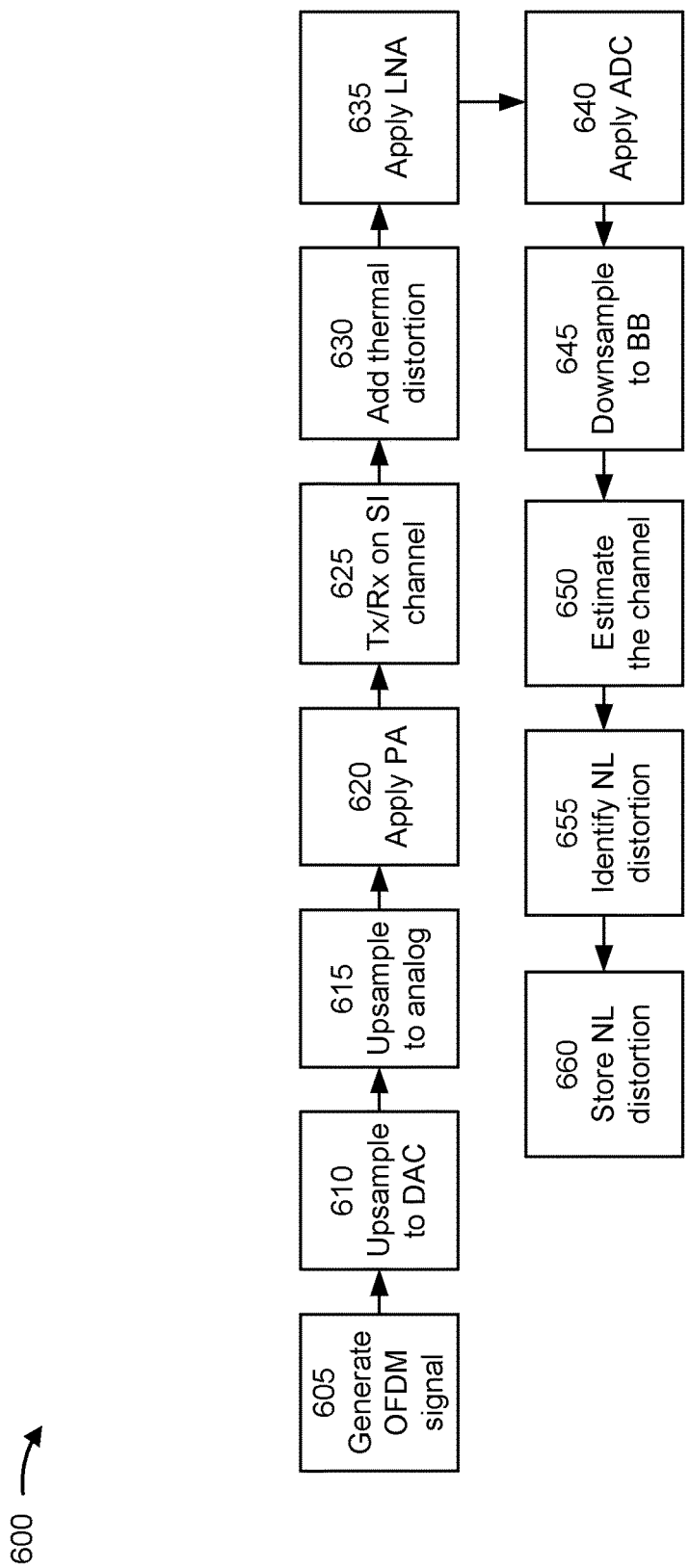
FIG. 6 is a diagram of an example associated with a training sensing operation in accordance with the present disclosure.

FIG. 6 is a diagram of an example 600 associated with a training sensing operation in accordance with the present disclosure. As shown in FIG. 6, a WCD (for example, a UE 120 or 220 or a network node 110 or 210) may perform a sensing training operation.

As shown in FIG. 6, and by first operation 605, the WCD may generate an OFDM signal as a sensing training signal (sometimes referred to herein as a training sensing signal). As shown in a second operation 610, the WCD may upsample the OFDM signal to a DAC. As shown in a third operation 615, the WCD may upsample the analog signal to an analog domain.

As shown in a fourth operation 620, the WCD may apply a PA to the signal before providing the sensing training signal to a transmission antenna. Applying the PA may cause NL distortion. In some aspects, the NL distortion may be associated with a transmission power used to transmit the sensing training signal. For this reason, the sensing training operation may include transmitting the sensing training signal with different transmission powers, which may be used to apply NL correction for different sensing operations with different transmission powers.

As shown in a fifth operation 625, the WCD may transmit the sensing training signal over the air via a transmitting antenna and may receive the sensing training signal over the air via an receiving antenna. As shown in a sixth operation 630, the WCD may add thermal distortion in association with a temperature of the WCD. The thermal distortion may include NL distortion. As shown in a seventh operation 635, the WCD may apply an LNA to amplify the sensing training signal for processing. In some aspects, applying the LNA may cause NL distortion (for example, in association with saturation levels of the received power or a peak-to-average-power-ratio of the sensing training signal).

As shown in an eighth operation 640, the WCD may apply an ADC to the sensing training signal. Applying the ADC to the sensing training signal may cause NL distortion to the sensing training signal. As shown in a ninth operation 645, the WCD may downsample the sensing training signal to a baseband (BB) frequency. As shown in a tenth operation, the WCD may estimate a channel 650 associated with SI of the sensing training signal (an SI channel without an sensing target).

As shown in an eleventh operation 655, the WCD may identify NL distortion. For example, using knowledge of the sensing training signal as transmitted, knowledge that no reflected signal should be received, or a channel estimate, the WCD may identify distortions associated with differences between the sensing training signal as transmitted and the sensing training signal as received.

As shown in a twelfth operation 660, the WCD may store information associated with the NL distortion. In some aspects, the information associated with NL distortion may include different NL distortion associated with different environmental parameters (for example temperature), or different transmission parameters (for example, transmission power or LNA saturation), among other examples.

Figure 7:
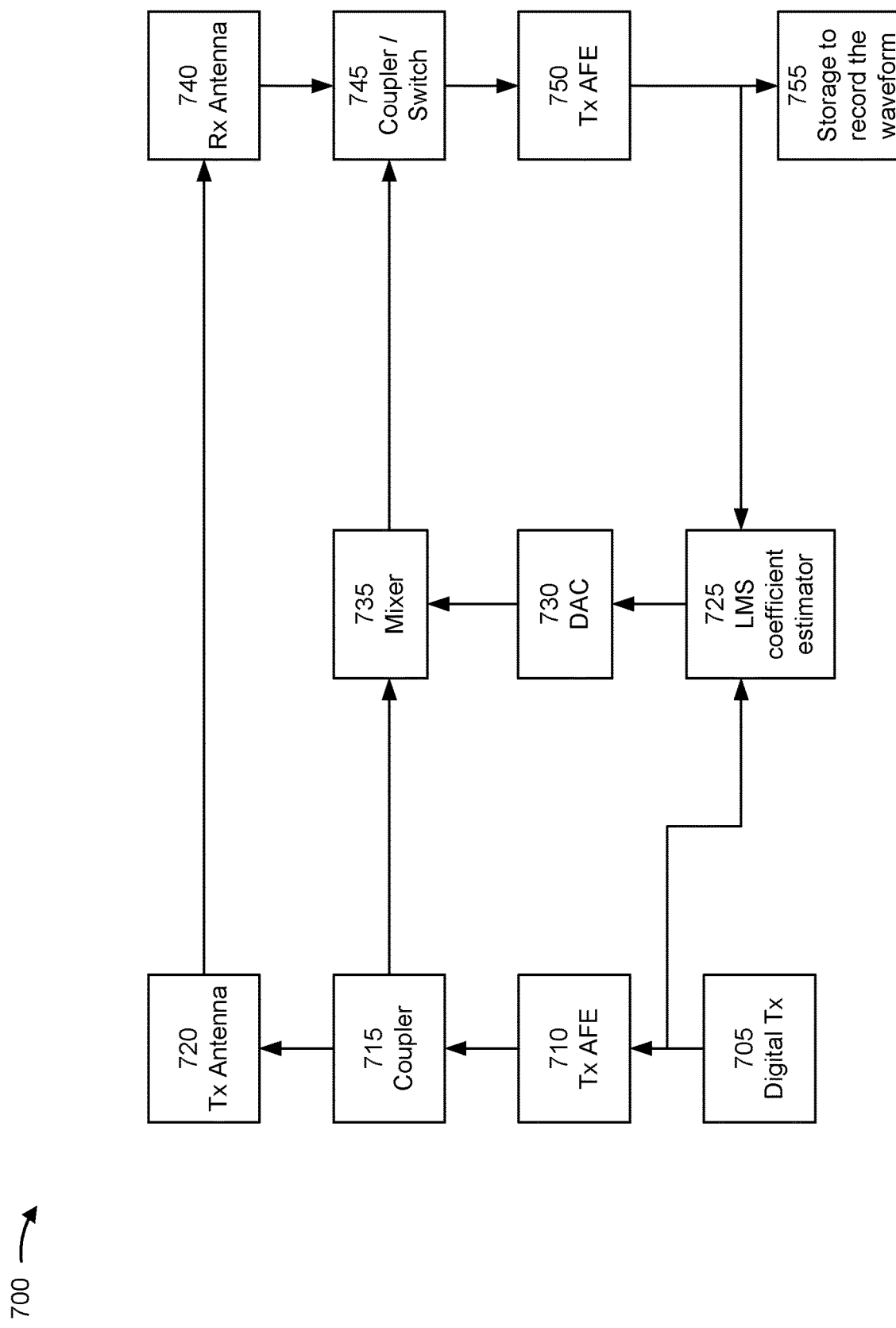
FIG. 7 is a diagram of an example associated with a training sensing operation in accordance with the present disclosure.

FIG. 7 is a diagram of an example 700 associated with a training sensing operation in accordance with the present disclosure. As shown in FIG. 7 a WCD (for example, a UE 120 or 220 or a network node 110 or 210) may perform a sensing training operation.

As shown in FIG. 7, the WCD may provide a digital transmission signal 705 to a transmission AFE 710. The AFE 710 may provide the an analog representation of the digital transmission signal 705 via a coupler 715 to a transmission antenna 720 for transmission over the air.

The WCD may also provide the digital transmission signal 705 to an LMS coefficient estimator 725. The LMS coefficient estimator may provide the digital transmission signal 705 to a DAC 730, which may provide an analog representation of the digital transmission signal 705 to a mixer 735. The mixer 735 may further receive an analog representation of the digital transmission signal 705 from the coupler 715 for mixing and providing to an reception side of the WCD.

In some aspects, an reception antenna 740 may receive the signal over the air via transmission by the transmission antenna 720. Alternatively, the reception antenna 740 may be powered off during a training sensing operation. The reception side of the WCD may further include a coupler/switch 745 that receives the signal via the mixer 735 and provides the signal to a transmission AFE 750. The transmission AFE may provide the signal to the LMS coefficient estimator 725, which may perform an iteration of combining, averaging, or correlating to identify a refined distortion estimation. The transmission AFE 750 may also provide the signal to a storage component 755 to record the waveform. For example, the WCD may store an indication of a first distortion associated with a controlled environment without a sensing target.

Figure 8:
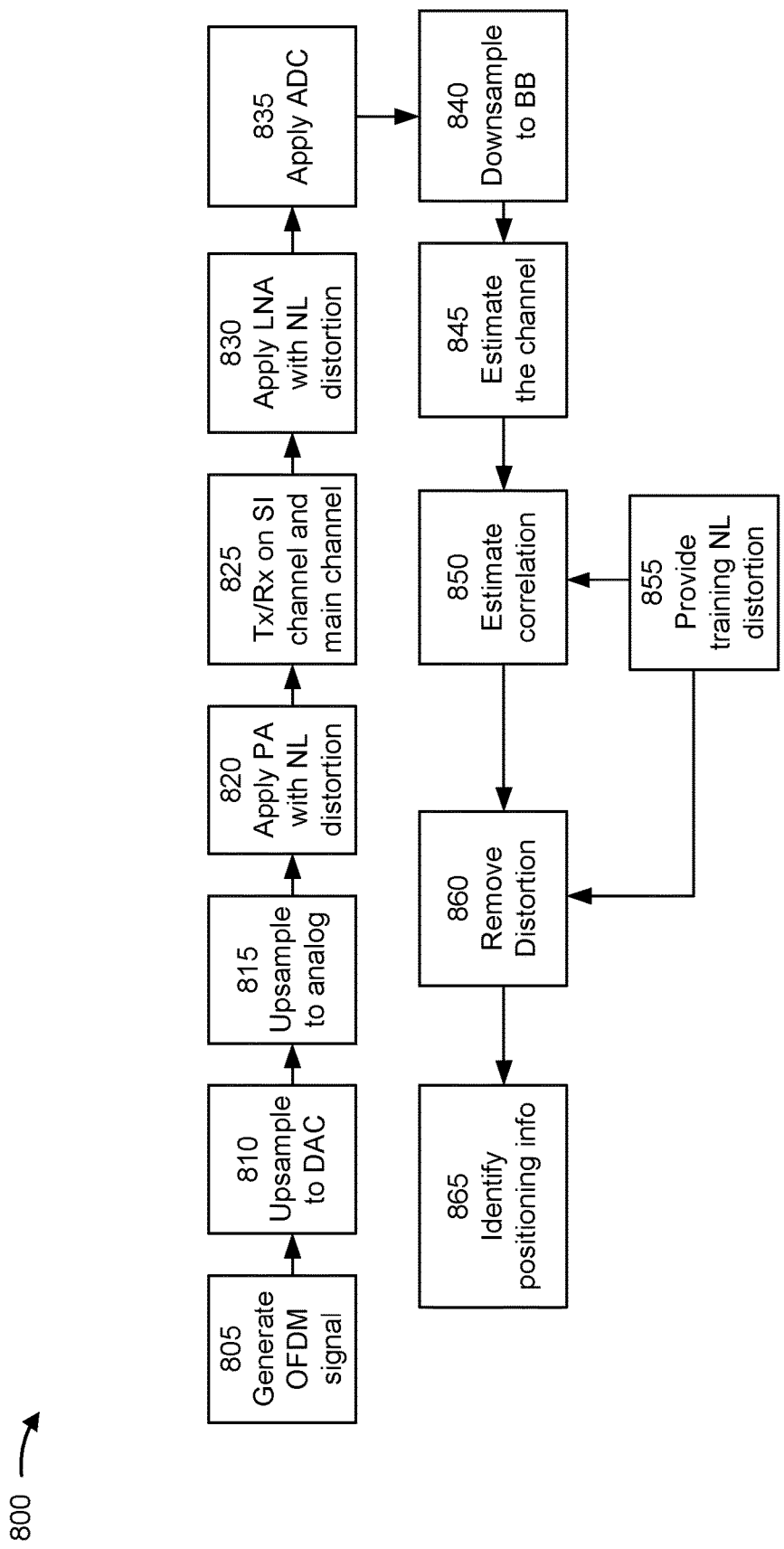
FIG. 8 is a diagram of an example associated with a sensing operation in accordance with the present disclosure.

FIG. 8 is a diagram of an example 800 associated with a sensing operation in accordance with the present disclosure. As shown in FIG. 8 a WCD (for example, a UE 120 or 220 or a network node 110 or 210) may perform the sensing operation.

As shown in FIG. 8, and by first operation 805, the WCD may generate an OFDM signal as a sensing signal. As shown in a second operation 810, the WCD may upsample the OFDM signal to a DAC. As shown in a third operation 815, the WCD may upsample the analog signal to an analog domain.

As shown in a fourth operation 820, the WCD may apply a PA to the signal before providing the sensing signal to a transmission antenna. Applying the PA may cause NL distortion. In some aspects, the NL distortion may be associated with a transmission power used to transmit the sensing signal.

As shown in a fifth operation 825, the WCD may transmit the sensing signal over the air via a transmitting antenna and may receive the sensing signal over the air via an receiving antenna. In some aspects, the WCD may receive a first portion of the sensing signal as SI and a second portion as a main sensing signal after interaction with a sensing target. As shown in a sixth operation 830, the WCD may apply an LNA to amplify the sensing signal for processing. In some aspects, applying the LNA may cause NL distortion (for example, in association with saturation levels of the received power or a peak-to-average-power-ratio of the sensing signal).

As shown in a seventh operation 835, the WCD may apply an ADC to the sensing signal. Applying the ADC to the sensing signal may cause NL distortion to the sensing signal. As shown in an eighth operation 840, the WCD may downsample the sensing signal to a baseband (BB) frequency. As shown in a ninth operation 845, the WCD may estimate a channel associated with SI of the sensing signal (an SI channel without an sensing target). As shown in a tenth operation, the WCD may estimate a correlation of the signals with a reference signal (for example, a null state or sensing operation without a sensing target).

As shown in an eleventh operation 855, the WCD may provide a training NL distortion to use for estimating the correlation of the sensing signal with a sensing training signal. As shown in a twelfth operation 860, the WCD may remove distortion from the sensing signal. For example, the WCD may multiply the training NL distortion with a factor that is associated with the estimated correlation to identify a distortion to remove from the sensing signal. As shown in a thirteenth operation 865, the WCD may identify positioning information of a sensing target in association with a remaining signal after removing the distortion.

Figure 9:
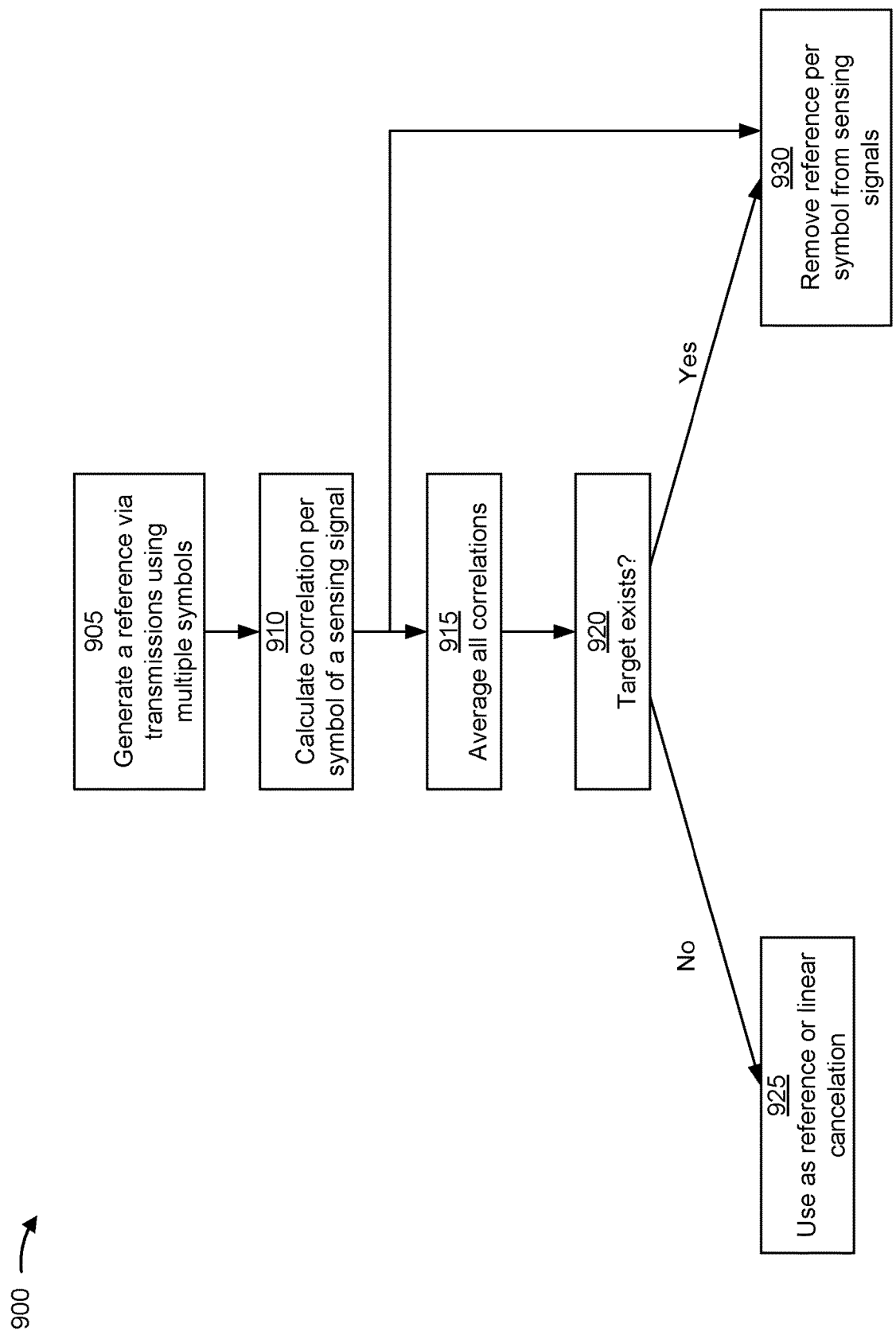
FIG. 9 is a diagram of an example associated with a sensing operation in accordance with the present disclosure.

FIG. 9 is a diagram of an example 900 associated with a sensing operation in accordance with the present disclosure. In context of FIG. 9, a WCD (for example, a UE 120 or 220 or a network node 110 or 210) may perform the sensing operation.

As shown in a first operation 905, the WCD may generate a reference channel response via transmissions using multiple symbols. For example, the WCD may perform operations, such as those described in connection with FIGS. 5-7 or other operations described herein.

As shown in a second operation 910, the WCD may calculate a correlation per symbol of a sensing signal. For example, the WCD may calculate the correlation with the reference channel response (for example, without a sensing target). In this way, the WCD detects how similar or varied a channel response of the sensing signal matches with the reference channel response (for example, a null state).

In some aspects, the WCD may transmit sensing signals via multiple symbols or may use different scrambling for each of the symbols. In this way, the WCD may reduce an effect of fading or other channel defects of the sensing signal.

As shown in a third operation 915, the WCD may average all correlations (for example, as indicated by a correlation value). In this way, the WCD may remove noise (for example, outliers) in the sensing signals and obtain a correlation value that has improved accuracy.

As shown in a fourth operation 920, the WCD may identify a presence of a sensing target. For example, if the average of the correlations converges to the reference correlation (for example, the null state, a measurement without a sensing target, or a measurement using a hardware assisted solution), then the sensing target is not present. Alternatively, if the average of the correlations does not converge to the reference correlation, then the sensing target is present.

As shown in a fifth operation 925, if the target is not present, the WCD may use the measurements of the sensing signals to generate an updated reference channel response or for linear cancelation of distortion. For example, in association with detected that the sensing target is not present, the WCD may add the measurements to a model for estimating the reference channel response.

As shown in a sixth operation 930, if the target is present, the WCD may remove the reference channel response per symbol from the sensing signals. For example, the WCD may combine (for example, multiple) the reference channel response (for example distortion of the null state) with the correlation per symbol, or average of the correlations, and subtract the combination from measurements of sensing signals per symbol. In this way, the WCD may remove the NL distortion associated with the reference channel response, and a remaining channel response may have improved accuracy in detecting positioning information associated with the sensing target.

Figure 10:
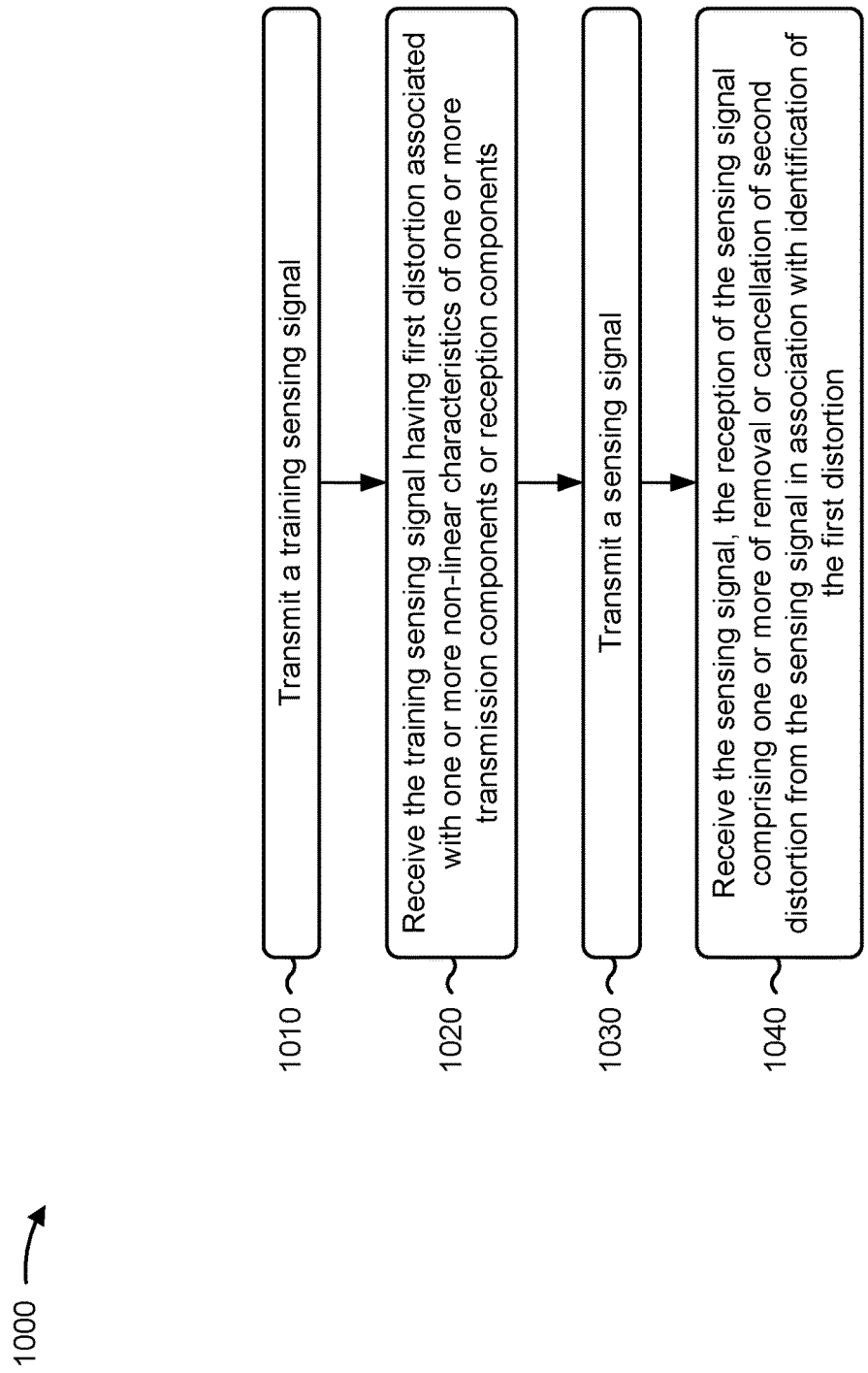
FIG. 10 is a flowchart illustrating an example process performed, for example, at a WCD or an apparatus of a wireless communication device (WCD) that supports distortion removal from a sensing signal in accordance with the present disclosure.

FIG. 10 is a flowchart illustrating an example process 1000 performed, for example, at a WCD or an apparatus of a WCD that supports distortion removal from a sensing signal in accordance with the present disclosure. Example process 1000 is an example where the apparatus or the WCD (for example, UE 120 or 220 or network node 110 or 210) performs operations associated with distortion removal from a sensing signal.

As shown in FIG. 10, in some aspects, process 1000 may include transmitting a training sensing signal (block 1010). For example, the WCD (such as by using communication manager 140 or 150 or transmission component 1104, depicted in FIG. 11) may transmit (such as via one or more transmission components) a training sensing signal, as described above.

As further shown in FIG. 10, in some aspects, process 1000 may include receiving the training sensing signal having first distortion associated with one or more non-linear characteristics of one or more transmission components or reception components (block 1020). For example, the WCD (such as by using communication manager 140 or 150 or reception component 1102, depicted in FIG. 11) may receive (such as via one or more reception components) the training sensing signal. The training sensing signal may have or otherwise be associated with first distortion. The first distortion may be associated with (such as caused by or derived from) one or more non-linear characteristics of one or more transmission components or reception components of the WCD, as described above.

As further shown in FIG. 10, in some aspects, process 1000 may include transmitting a sensing signal (block 1030). For example, the WCD (such as by using communication manager 140 or 150 or transmission component 1104, depicted in FIG. 11) may transmit (such as via the one or more transmission components) a sensing signal, as described above.

As further shown in FIG. 10, in some aspects, process 1000 may include receiving the sensing signal, the reception of the sensing signal comprising one or more of removal or cancellation of second distortion from the sensing signal in accordance with the first distortion (block 1040). For example, the WCD (such as by using communication manager 140 or 150 or reception component 1102, depicted in FIG. 11) may receive (such as via the one or more reception components) the sensing signal. "Reception of the sensing signal" may include at least one of removal or cancellation (where removal and cancellation can be the same operation or different operations) of second distortion from the sensing signal in accordance with the first distortion, as described above. Process 1000 may include additional aspects, such as any single aspect or any combination of aspects described below or in connection with one or more other processes described elsewhere herein.

In a first additional aspect, the first distortion of the training sensing signal comprises linear distortion and non-linear distortion.

In a second additional aspect, alone or in combination with the first aspect, the first distortion is associated with a set of first distortions, the set of first distortions being associated with one or more of a set of temperatures or a set of transmission powers, and wherein removing or canceling the second distortion from the sensing signal comprises removing or canceling the second distortion in accordance with the first distortion of the set of first distortions, wherein the removing or canceling is in association with a temperature or a transmission power associated with transmission of the sensing signal. For example, the WCD may use the temperature associated with transmission of the sensing signal to identify a first distortion of the set of first distortions, such as by referring to the set of temperatures (which may include referring to a lookup table indicating the set of temperatures and corresponding first distortions). As another example, the WCD may use the transmission power associated with transmission of the sensing signal to identify a first distortion of the set of first distortions, such as by referring to the set of transmission powers (which may include referring to a lookup table indicating the set of transmission powers and corresponding first distortions). The WCD can then use the identified first distortion to remove or cancel the second distortion, as described elsewhere herein.

In a third additional aspect, alone or in combination with one or more of the first and second aspects, transmitting the training sensing signal and receiving the training sensing signal comprises transmitting the training sensing signal and receiving the training sensing signal in a test environment.

In a fourth additional aspect, alone or in combination with one or more of the first through third aspects, the test environment is void of an object that can be sensed.

In a fifth additional aspect, alone or in combination with one or more of the first through fourth aspects, process 1000 includes receiving input indicating that a sensing beam is directed to an environment such as a field of view that is void of an object that can be sensed, wherein transmitting the training sensing signal is in association with receiving the input.

In a sixth additional aspect, alone or in combination with one or more of the first through fifth aspects, process 1000 includes providing an instruction to direct the sensing beam to the environment that is void of the object that can be sensed, wherein receiving the input is in association with providing the instruction.

In a seventh additional aspect, alone or in combination with one or more of the first through sixth aspects, process 1000 includes providing an instruction to direct a sensing beam to an environment that is void of an object that can be sensed in association with detection of a change in one or more parameters at the WCD.

In an eighth additional aspect, alone or in combination with one or more of the first through seventh aspects, transmitting the training sensing signal and receiving the training sensing signal comprises transmitting the training sensing signal over the air, and receiving the training sensing signal via a bus that couples a first analog front end (AFE) of a transmission antenna to a second AFE of a reception antenna.

In a ninth additional aspect, alone or in combination with one or more of the first through eighth aspects, transmitting the sensing signal comprises scrambling a set of symbols of the sensing signal with different scrambling applied on respective symbols of the set of symbols.

In a tenth additional aspect, alone or in combination with one or more of the first through ninth aspects, receiving the sensing signal comprises estimating correlations for the respective symbols, combining the correlations, and identifying whether a sensing target is present in a sensing beam.

In an eleventh additional aspect, alone or in combination with one or more of the first through tenth aspects, identifying whether the sensing target is present in the sensing beam comprises identifying an absence of the sensing target within the sensing beam in association with combined correlations for the set of symbols having a similarity, that satisfies a threshold, with combined correlations of the training sensing signal, or identifying a presence of the sensing target within the sensing beam in association with combined correlations for the set of symbols having a similarity, that fails to satisfy the threshold, with the combined correlations of the training sensing signal.

In a twelfth additional aspect, alone or in combination with one or more of the first through eleventh aspects, process 1000 includes updating a value of the first distortion to a third distortion in association with identifying an absence of the sensing target, the third distortion associated with one or more of removing or canceling distortion of subsequent sensing signals, or removing or canceling the second distortion in association with identifying a presence of the sensing target.

In a thirteenth additional aspect, alone or in combination with one or more of the first through twelfth aspects, one or more of removing or canceling the second distortion from the sensing signal in accordance with the first distortion comprises identifying a correlation value associated with the sensing signal as transmitted and the sensing signal as received, and identifying the second distortion as a combination of the first distortion and the correlation value.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
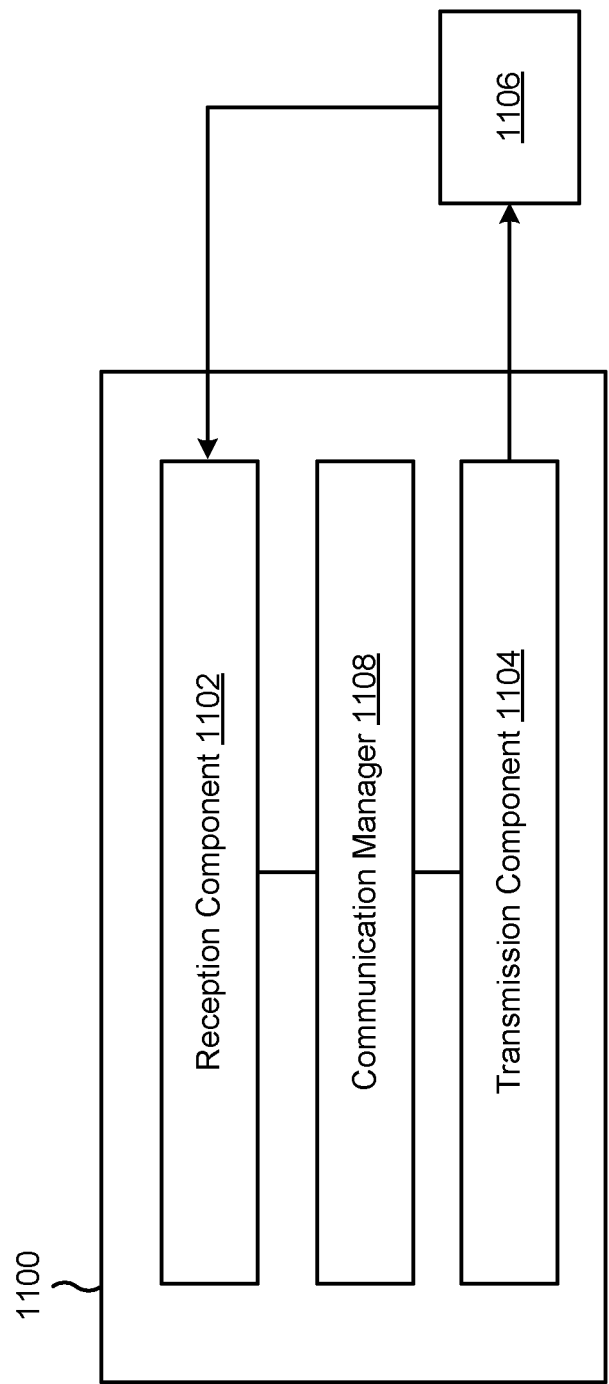
FIG. 11 is a diagram of an example apparatus for wireless communication that supports distortion removal from a sensing signal in accordance with the present disclosure.

FIG. 11 is a diagram of an example apparatus 1100 for wireless communication that supports distortion removal from a sensing signal in accordance with the present disclosure. The apparatus 1100 may be a WCD, or a WCD may include the apparatus 1100. In some aspects, the apparatus 1100 includes a reception component 1102, a transmission component 1104, and a communication manager 1108 (for example communication manager 140 or 150), which may be in communication with one another (for example, via one or more buses). As shown, the apparatus 1100 may communicate with another apparatus 1106 (such as a UE, a network node, or another wireless communication device) using the reception component 1102 and the transmission component 1104.

In some aspects, the apparatus 1100 may be configured to and/or operable to perform one or more operations described herein in connection with FIGS. 5-9. Additionally or alternatively, the apparatus 1100 may be configured to and/or operable to perform one or more processes described herein, such as process 1000 of FIG. 10. In some aspects, the apparatus 1100 may include one or more components of the WCD described above in connection with FIG. 2.

The reception component 1102 may receive communications, such as reference signals, control information, and/or data communications, from the apparatus 1106. The reception component 1102 may provide received communications to one or more other components of the apparatus 1100, such as the communication manager 1108. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, one or more modems, one or more demodulators, one or more MIMO detectors, one or more receive processors, one or more controllers/processors, and/or one or more memories of the WCD described above in connection with FIG. 2.

The transmission component 1104 may transmit communications, such as reference signals, control information, and/or data communications, to the apparatus 1106. In some aspects, the communication manager 1108 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, one or more modems, one or more modulators, one or more transmit MIMO processors, one or more transmit processors, one or more controllers/processors, and/or one or more memories of the WCD described above in connection with FIG. 2. In some aspects, the transmission component 1104 may be co-located with the reception component 1102 in one or more transceivers.

The communication manager 1108 may transmit or may cause the transmission component 1104 to transmit a training sensing signal. The communication manager 1108 may receive or may cause the reception component 1102 to receive the training sensing signal having first distortion associated with one or more non-linear characteristics of one or more transmission components or reception components. The communication manager 1108 may transmit or may cause the transmission component 1104 to transmit a sensing signal. The communication manager 1108 may receive or may cause the reception component 1102 to receive the sensing signal, reception of the sensing signal comprising one or more of removal or cancellation of second distortion from the sensing signal in accordance with the first distortion. In some aspects, the communication manager 1108 may perform one or more operations described elsewhere herein as being performed by one or more components of the communication manager 1108.

The communication manager 1108 may include one or more controllers/processors, one or more memories, one or more schedulers, and/or one or more communication units of the WCD described above in connection with FIG. 2. Alternatively, the set of components may be separate and distinct from the communication manager 1108. In some aspects, one or more components of the set of components may include or may be implemented within one or more controllers/processors, one or more memories, one or more schedulers, and/or one or more communication units of the WCD described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The transmission component 1104 may transmit a training sensing signal. The reception component 1102 may receive the training sensing signal having first distortion associated with one or more non-linear characteristics of one or more transmission components or reception components. The transmission component 1104 may transmit a sensing signal. The reception component 1102 may receive the sensing signal, reception of the sensing signal comprising one or more of removal or cancellation of second distortion from the sensing signal in accordance with the first distortion.

The reception component 1102 may receive input indicating that a sensing beam is directed to an environment that is void of an object that can be sensed wherein transmitting the training sensing signal is in association with receiving the input.

The communication manager 1108 may provide an instruction to direct the sensing beam to the environment that is void of the object that can be sensed wherein receiving the input is in association with providing the instruction.

The communication manager 1108 may provide an instruction to direct a sensing beam to an environment that is void of an object that can be sensed in association with detection of a change in one or more parameters at the WCD.

The communication manager 1108 may update the first distortion in association with identifying an absence of the sensing target.

The communication manager 1108 may remove the second distortion in association with identifying a presence of the sensing target.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a wireless communication device (WCD), comprising: transmitting, via one or more transmission components, a training sensing signal; receiving, via one or more reception components, the training sensing signal, the received training sensing signal having first distortion associated with one or more nonlinear characteristics of the one or more transmission components or of the one or more reception components; transmitting, via the one or more transmission components, a sensing signal; and receiving, via the one or more reception components, the sensing signal, the reception of the sensing signal comprising one or more of removing or canceling second distortion from the sensing signal in accordance with the first distortion.

Aspect 2: The method of Aspect 1, wherein the first distortion of the training sensing signal comprises linear distortion and non-linear distortion.

Aspect 3: The method of any of Aspects 1-2, wherein the first distortion is associated with a set of first distortions, the set of first distortions being associated with one or more of a set of temperatures or a set of transmission powers, and wherein removing or canceling the second distortion from the sensing signal comprises removing or canceling the second distortion in accordance with the first distortion of the set of first distortions, wherein the removing or canceling is in association with a temperature or a transmission power associated with transmission of the sensing signal.

Aspect 4: The method of any of Aspects 1-3, further comprising receiving input indicating that a sensing beam is directed to a field of view that is void of an object that can be sensed, wherein transmitting the training sensing signal is in association with receiving the input.

Aspect 5: The method of Aspect 4, further comprising providing an instruction to direct the sensing beam to the field of view that is void of the object that can be sensed, wherein receiving the input is in association with providing the instruction.

Aspect 6: The method of any of Aspects 1-5, further comprising: providing an instruction to direct a sensing beam to a field of view that is void of an object that can be sensed in association with detection of a change in one or more parameters at the WCD.

Aspect 7: The method of any of Aspects 1-6, wherein transmitting the training sensing signal and receiving the training sensing signal comprises: transmitting the training sensing signal over the air; and receiving the training sensing signal via a bus that couples a first analog front end (AFE) of a transmission antenna to a second AFE of a reception antenna.

Aspect 8: The method of any of Aspects 1-7, wherein transmitting the sensing signal comprises: scrambling the sensing signal using a set of symbols with different scrambling applied on respective symbols of the set of symbols.

Aspect 9: The method of Aspect 8, wherein receiving the sensing signal comprises: estimating correlations for the respective symbols; combining the correlations; and identifying whether a sensing target is present in a sensing beam.

Aspect 10: The method of Aspect 9, wherein identifying whether the sensing target is present in the sensing beam comprises: identifying an absence of the sensing target within the sensing beam in association with combined correlations for the set of symbols having a similarity, that satisfies a threshold, with combined correlations of the training sensing signal; or identifying a presence of the sensing target within the sensing beam in association with combined correlations for the set of symbols having a similarity, that fails to satisfy the threshold, with the combined correlations of the training sensing signal.

Aspect 11: The method of Aspect 9, further comprising: updating a value of the first distortion to a third distortion in association with identifying an absence of the sensing target, the third distortion associated with one or more of removing or canceling distortion of subsequent sensing signals; or removing or canceling the second distortion in association with identifying a presence of the sensing target.

Aspect 12: The method of any of Aspects 1-11, wherein one or more of removing or canceling the second distortion from the sensing signal in accordance with the first distortion comprises: identifying a correlation value associated with the sensing signal as transmitted and the sensing signal as received; and identifying the second distortion as a combination of the first distortion and the correlation value.

Aspect 13: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-12.

Aspect 14: An apparatus for wireless communication at a device, the apparatus comprising one or more memories and one or more processors coupled to the one or more memories, the one or more processors configured to cause the device to perform the method of one or more of Aspects 1-12.

Aspect 15: An apparatus for wireless communication, the apparatus comprising at least one means for performing the method of one or more of Aspects 1-12.

Aspect 16: A non-transitory computer-readable medium storing code for wireless communication, the code comprising instructions executable by one or more processors to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

Aspect 18: A device for wireless communication, the device comprising a processing system that includes one or more processors and one or more memories coupled with the one or more processors, the processing system configured to cause the device to perform the method of one or more of Aspects 1-12.

Aspect 19: An apparatus for wireless communication at a device, the apparatus comprising one or more memories and one or more processors coupled to the one or more memories, the one or more processors individually or collectively configured to cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A method of wireless communication performed by a wireless communication device (WCD), comprising:
   transmitting, via one or more transmission components, a training sensing signal;
   receiving, via one or more reception components, the training sensing signal, the received training sensing signal having first distortion associated with one or more nonlinear characteristics of the one or more transmission components or of the one or more reception components;
   transmitting, via the one or more transmission components, a sensing signal; and
   receiving, via the one or more reception components, the sensing signal, the reception of the sensing signal comprising one or more of removing or canceling second distortion from the sensing signal in accordance with the first distortion.

2. The method of claim 1, wherein the first distortion of the training sensing signal comprises linear distortion and non-linear distortion.

3. The method of claim 1, wherein the first distortion is associated with a set of first distortions, the set of first distortions being associated with one or more of a set of temperatures or a set of transmission powers, and wherein removing or canceling the second distortion from the sensing signal comprises removing or canceling the second distortion in accordance with the first distortion of the set of first distortions, wherein the removing or canceling is in association with a temperature or a transmission power associated with transmission of the sensing signal.

4. The method of claim 1, further comprising receiving input indicating that a sensing beam is directed to a field of view that is void of an object that can be sensed, wherein transmitting the training sensing signal is in association with receiving the input.

5. The method of claim 4, further comprising providing an instruction to direct the sensing beam to the field of view that is void of the object that can be sensed, wherein receiving the input is in association with providing the instruction.

6. The method of claim 1, further comprising:
providing an instruction to direct a sensing beam to a field of view that is void of an object that can be sensed in association with detection of a change in one or more parameters at the WCD.

7. The method of claim 1, wherein transmitting the training sensing signal and receiving the training sensing signal comprises:
transmitting the training sensing signal over the air; and
receiving the training sensing signal via a bus that couples a first analog front end (AFE) of a transmission antenna to a second AFE of a reception antenna.

8. The method of claim 1, wherein transmitting the sensing signal comprises:
scrambling a set of symbols of the sensing signal with different scrambling applied on respective symbols of the set of symbols.

9. The method of claim 8, wherein receiving the sensing signal comprises:
estimating correlations for the respective symbols;
combining the correlations; and
identifying whether a sensing target is present in a sensing beam.

10. The method of claim 9, wherein identifying whether the sensing target is present in the sensing beam comprises:
identifying an absence of the sensing target within the sensing beam in association with combined correlations for the set of symbols having a similarity, that satisfies a threshold, with combined correlations of the training sensing signal; or
identifying a presence of the sensing target within the sensing beam in association with combined correlations for the set of symbols having a similarity, that fails to satisfy the threshold, with the combined correlations of the training sensing signal.

11. The method of claim 9, further comprising:
updating a value of the first distortion to a third distortion in association with identifying an absence of the sensing target, the third distortion associated with one or more of removing or canceling distortion of subsequent sensing signals; or
removing or canceling the second distortion in association with identifying a presence of the sensing target.

12. The method of claim 1, wherein one or more of removing or canceling the second distortion from the sensing signal in accordance with the first distortion comprises:
identifying a correlation value associated with the sensing signal as transmitted and the sensing signal as received; and
identifying the second distortion as a combination of the first distortion and the correlation value.

13. A wireless communication device (WCD) for wireless communication, comprising:
a processing system that includes one or more processors and one or more memories coupled with the one or more processors, the processing system configured to cause the WCD to:
transmit, via one or more transmission components, a training sensing signal;
receive, via one or more reception components, the training sensing signal, the received training sensing signal having first distortion associated with one or more nonlinear characteristics of the one or more transmission components or of the one or more reception components;
transmit, via the one or more transmission components, a sensing signal; and
receive, via the one or more reception components, the sensing signal, the reception of the sensing signal comprising one or more of removal or cancellation second distortion from the sensing signal in accordance with the first distortion.

14. The WCD of claim 13, wherein the first distortion of the training sensing signal comprises linear distortion and non-linear distortion.

15. The WCD of claim 13, wherein the first distortion is associated with a set of first distortions, the set of first distortions being associated with one or more of a set of temperatures or a set of transmission powers, and
wherein the processing system, to cause the WCD to remove or cancel the second distortion from the sensing signal, is configured to cause the WCD to remove or cancel the second distortion in accordance with the first distortion of the set of first distortions, wherein the removing or canceling is in association with a temperature or a transmission power associated with transmission of the sensing signal.

16. The WCD of claim 13, wherein the processing system is further configured to cause the WCD to receive input indicating that a sensing beam is directed to a field of view that is void of an object that can be sensed, wherein transmitting the training sensing signal is in association with receiving the input.

17. The WCD of claim 16, wherein the processing system is further configured to cause the WCD to provide an instruction to direct the sensing beam to the field of view that is void of the object that can be sensed, wherein receiving the input is in association with providing the instruction.

18. The WCD of claim 13, wherein the processing system is further configured to cause the WCD to:
provide an instruction to direct a sensing beam to a field of view that is void of an object that can be sensed in association with detection of a change in one or more parameters at the WCD.

19. The WCD of claim 13, wherein, to cause the WCD to transmit the training sensing signal and receiving the training sensing signal, the processing system is configured to cause the WCD to:
transmit the training sensing signal over the air; and
receive the training sensing signal via a bus that couples a first analog front end (AFE) of a transmission antenna to a second AFE of a reception antenna.

20. The WCD of claim 13, wherein, to cause the WCD to transmit the sensing signal, the processing system is configured to cause the WCD to:
scramble a set of symbols of the sensing signal with different scrambling applied on respective symbols of the set of symbols.

21. The WCD of claim 20, wherein, to cause the WCD to receive the sensing signal, the processing system is configured to cause the WCD to:
- estimate correlations for the respective symbols;
- combine the correlations; and
- identify whether a sensing target is present in a sensing beam.

22. The WCD of claim 21, wherein, to cause the WCD to identify whether the sensing target is present in the sensing beam, the processing system is configured to cause the WCD to:
- identify an absence of the sensing target within the sensing beam in association with combined correlations for the set of symbols having a similarity, that satisfies a threshold, with combined correlations of the training sensing signal; or
- identify a presence of the sensing target within the sensing beam in association with combined correlations for the set of symbols having a similarity, that fails to satisfy the threshold, with the combined correlations of the training sensing signal.

23. The WCD of claim 21, wherein the processing system is further configured to cause the WCD to:
- update a value of the first distortion to a third distortion in association with identifying an absence of the sensing target, the third distortion associated with one or more of removing or canceling distortion of subsequent sensing signals; or
- remove or canceling the second distortion in association with identifying a presence of the sensing target.

24. The WCD of claim 13, wherein, to cause the WCD to remove or cancel the second distortion from the sensing signal in accordance with the first distortion, the processing system is further configured to cause the WCD to:
- identify a correlation value associated with the sensing signal as transmitted and the sensing signal as received; and
- identify the second distortion as a combination of the first distortion and the correlation value.

25. A non-transitory computer-readable medium storing a set of instructions for wireless communication, the set of instructions comprising:
- one or more instructions that, when executed by one or more processors of a wireless communication device (WCD), cause the WCD to:
  - transmit, via one or more transmission components, a training sensing signal;
  - receive, via one or more reception components, the training sensing signal, the received training sensing signal having first distortion associated with one or more nonlinear characteristics of the one or more transmission components or of the one or more reception components;
  - transmit, via the one or more transmission components, a sensing signal; and
  - receive, via the one or more reception components, the sensing signal, the reception of the sensing signal comprising one or more of removing or canceling second distortion from the sensing signal in accordance with the first distortion.

26. The non-transitory computer-readable medium of claim 25, wherein the first distortion of the training sensing signal comprises linear distortion and non-linear distortion.

27. The non-transitory computer-readable medium of claim 25, wherein the one or more instructions, when executed by the one or more processors, cause the WCD to receive input indicating that a sensing beam is directed to a field of view that is void of an object that can be sensed, wherein transmitting the training sensing signal is in association with receiving the input.

28. An apparatus for wireless communication, comprising:
- means for transmitting, via one or more transmission components, a training sensing signal;
- means for receiving, via one or more reception components, the training sensing signal, the received training sensing signal having first distortion associated with one or more nonlinear characteristics of the one or more transmission components or of the one or more reception components;
- means for transmitting, via the one or more transmission components, a sensing signal; and
- means for receiving, via the one or more reception components, the sensing signal, the reception of the sensing signal comprising one or more of removing or canceling second distortion from the sensing signal in accordance with the first distortion.

29. The apparatus of claim 28, wherein the first distortion of the training sensing signal comprises linear distortion and non-linear distortion.

30. The apparatus of claim 28, further comprising means for receiving input indicating that a sensing beam is directed to a field of view that is void of an object that can be sensed, wherein transmitting the training sensing signal is in association with receiving the input.

* * * * *